(12) United States Patent
Roden et al.

(10) Patent No.: US 11,010,488 B2
(45) Date of Patent: *May 18, 2021

(54) SYSTEMS AND METHODS FOR DYNAMIC QUEUE CONTROL USING MACHINE LEARNING TECHNIQUES

(71) Applicant: Live Nation Entertainment, Inc., Beverly Hills, CA (US)

(72) Inventors: Mark Roden, Los Angeles, CA (US); Dan Cernoch, Los Angeles, CA (US); Victoria Chung, Irvine, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,910

(22) Filed: Jan. 13, 2020

(65) Prior Publication Data

US 2020/0226277 A1 Jul. 16, 2020

Related U.S. Application Data

(63) Continuation of application No. 16/195,568, filed on Nov. 19, 2018, now Pat. No. 10,534,928.

(51) Int. Cl.
*G06F 21/62* (2013.01)
*G06N 20/00* (2019.01)

(52) U.S. Cl.
CPC ......... *G06F 21/6218* (2013.01); *G06N 20/00* (2019.01)

(58) Field of Classification Search
CPC ...... G06F 21/62; G06F 21/6218; G06F 21/10; G06F 16/24; G06N 20/00; H04N 44/02; H04L 51/12
See application file for complete search history.

(56) References Cited

U.S. PATENT DOCUMENTS

| 192,072 | A | 6/1877 | Jamieson |
| 8,281,382 | B1* | 10/2012 | Sanyal .................. H04L 47/125 726/9 |
| 9,529,634 | B1* | 12/2016 | Hsu ........................... G06F 9/46 |
| 9,600,340 | B1 | 3/2017 | Mundar |
| 9,628,555 | B2 | 4/2017 | Washbrook et al. |
| 10,205,728 | B2 | 2/2019 | Carnahan et al. |
| 10,419,440 | B2 | 9/2019 | Carnahan et al. |
| 10,534,928 | B1 | 1/2020 | Roden et al. |

(Continued)

OTHER PUBLICATIONS

Jiantao Yuan et al, "Massive Machine-to-Machine Communications in Cellular Network: Distributed Queueing Random Access Meets MIMO", IEEE Access vol. 5, IEEE, Mar. 28, 2017, 13 pages.

(Continued)

*Primary Examiner* — Shanto Abedin

(74) *Attorney, Agent, or Firm* — Kilpatrick Townsend & Stockton, LLP

(57) ABSTRACT

Certain embodiments of the present disclosure relate to systems and methods that control access to system resources, such as interfaces, access rights to events, query systems, and other suitable system resources. Further, certain embodiments of the present disclosure relate to a collision detection technique that is implemented to control which and/or a number of queue positions within a queue that are processed. In some implementations, a collision may be detected when two or more users request the same access right within a defined time period.

20 Claims, 18 Drawing Sheets

(56) References Cited

U.S. PATENT DOCUMENTS

| | | | |
|---|---|---|---|
| 2005/0278626 A1 | 12/2005 | Malik | |
| 2007/0237082 A1* | 10/2007 | Han | H04L 49/9078 370/235 |
| 2011/0055834 A1* | 3/2011 | Meda | G06F 11/3466 718/101 |
| 2012/0062362 A1 | 3/2012 | Rudduck et al. | |
| 2012/0173477 A1 | 7/2012 | Coutts et al. | |
| 2014/0089282 A1* | 3/2014 | Sampathkumar | G06F 16/24 707/705 |
| 2015/0120341 A1 | 4/2015 | Scarborough | |
| 2016/0036833 A1 | 2/2016 | Ardeli et al. | |
| 2016/0080943 A1 | 3/2016 | Ives-Halperin et al. | |
| 2016/0212754 A1 | 7/2016 | Mendiola et al. | |
| 2016/0373521 A1* | 12/2016 | Washbrook | H04L 63/107 |
| 2017/0149795 A1 | 5/2017 | Day, II | |
| 2017/0230376 A1* | 8/2017 | McEwen | H04L 63/083 |
| 2018/0219819 A1* | 8/2018 | O'Brien | H04L 61/2007 |
| 2018/0337927 A1 | 11/2018 | Carnahan et al. | |
| 2019/0384632 A1* | 12/2019 | Parikh | G06F 21/604 |

OTHER PUBLICATIONS

PCT/US2018/033365 received an International Search Report and Written Opinion dated Aug. 6, 2018, 10 pages.

PCT/US2018/033365 received an International Preliminary Report on Patentability dated Nov. 28, 2019, 7 pages.

U.S. Appl. No. 16/272,761 received a Notice of Allowance dated May 1, 2019, 7 pages.

U.S. Appl. No. 16/272,761 received a Corrected Notice of Allowability dated Jun. 26, 2019, 4 pages.

U.S. Appl. No. 16/272,761 received a First Action Interview Pilot Program Pre-Interview Communication dated Mar. 22, 2019, 13 pages.

U.S. Appl. No. 16/195,568 received a First Action Interview Pilot Program Pre-Interview Communication dated Feb. 11, 2019, 4 pages.

U.S. Appl. No. 16/195,568 received a Notice of Allowance dated Jun. 11, 2019, 13 pages.

U.S. Appl. No. 16/195,568 received a Notice of Allowance dated Oct. 4, 2019, 9 pages.

U.S. Appl. No. 15/983,475 received a Corrected Notice of Allowance dated Dec. 3, 2018, 4 pages.

U.S. Appl. No. 15/983,475 received a Notice of Allowance dated Sep. 28, 2018, 12 pages.

U.S. Appl. No. 15/983,475 received a First Action Interview Pilot Program Pre-Interview Communication dated Jul. 26, 2018, 4 pages.

U.S. Appl. No. 16/572,026 received a Non-Final Office Action dated Aug. 14, 20202, 17 pages.

* cited by examiner

SYSTEMS AND METHODS FOR DYNAMIC QUEUE CONTROL USING MACHINE LEARNING TECHNIQUES

CROSS REFERENCE TO RELATED APPLICATIONS

This application is a continuation application of U.S. application Ser. No. 16/195,568, filed Nov. 19, 2018, the disclosure of which is incorporated by reference in its entirety for all purposes.

TECHNICAL FIELD

The present disclosure generally relates to controlling access to resources by dynamically throttling queue processing. More specifically, the present disclosure relates to systems and methods for using collision detection techniques, described herein, to automatically control which and/or how many queue positions within one or more queues are processed (e.g., are granted or provided with access to a system resource, such as, for example, an interface page that enables users to query a set of available access rights).

BACKGROUND

Load management systems can process the assignment of access rights to user devices. For example, an access right can be configured to grant a user device access to a resource. Generally, assigning access rights to user devices occurs on a first-come-first-served basis. However, unauthorized activity, such as by hackers or bot scripts, has increased. For instance, bot scripts can be configured to mimic user devices to obtain access to resources in an unauthorized manner. As the load of user requests increases in scale (e.g., to big-data levels), securing load management systems against unauthorized activity becomes more challenging. Automatically detecting unauthorized activity at a large scale and controlling workflows to manage or block the unauthorized activity has been inefficient and burdensome on network resources.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Certain embodiments of the present disclosure relate to systems and methods that control access to system resources, such as interfaces, access rights to events, query systems, and other suitable system resources. Further, certain embodiments of the present disclosure relate to a collision detection technique that is implemented to control (e.g., throttle at varying levels responsive to a rate of collisions detected) which and/or a number of queue positions within a queue that are processed. In some implementations, a collision may be detected when two or more users request the same access right within a defined time period (e.g., within 5 seconds, 30 seconds, 1 minute, 5 minutes of each other), or when one user requests an access right that is currently held (e.g., on reserve) for another user.

To illustrate and only as a non-limiting example, a primary load management system may store access rights to resources. The primary load management system may be accessible to users operating user devices by a login or homepage. User devices, such as computers operated by users, may access the primary load management system to query the access rights that satisfy certain constraints. When a user logs in, the user may not immediately be provided with access to the interface, but rather, the user's request for access to the interface may be stored in a queue position of a queue. The user may be provided access to the interface for querying access rights when the queue position is processed by the primary load management system. For instance, a single request communication from a user device may be stored in a single queue position of the queue. Over a time period, a number of queue positions may be provided access to an interface that enables the user devices to query for access rights. The number of queue positions that are provided access to the querying interface per time interval may be modifiable in real-time based on a collision detection technique described herein and below. Querying for access rights may include transmitting (from the user device) one or more constraints (e.g., data used to constrain the query) to the primary load management system, so that the primary load management system can query the database(s) that store the access rights to resources.

However, at the same or substantially the same time, a large number of user devices may access the primary load management system for the purpose of querying for access rights to request assignment of one or more queried access rights. This may overload the primary load management system causing, for example, interfaces to be slow or to fail to load, servers to overload or overheat, or network resources to be burdened by high processing loads. Accordingly, certain embodiments of the present disclosure provide a collision detection technique that can be used to control which and/or how many user devices are given access to the interface for querying access rights. In some implementations, the number of queue positions in the digital queue that are processed or that are given access to the interface that enables the users to query for access rights changes so as to maintain a substantially similar or constant collision rate. This implementation may increase the number of queue positions that are processed during a time interval when detected collisions are below a threshold number. Conversely, this implementation may decrease the number of queue positions that are processed during the time interval when detected collisions are above the threshold number. In some implementations, the initial rate of processing queue positions (in which requests from users are stored) of the queue may be determined based, at least in part, on a number of access rights available for assignment to users.

Certain embodiments of the present disclosure include a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system, including: one or more processors; and a non-transitory computer-readable storage medium containing instructions which, when executed on the one or more processors, cause the one or more processors to perform operations including: The system also includes storing a plurality of access rights to a resource, each access right of the plurality of access rights enabling access to the resource, and each access right of the plurality of access rights being unique from other access rights of the plurality of access rights. The system also includes receiving a plurality of communications, each communication of the plurality of communications corresponding to a request for assignment of one or more access rights of the plurality of access rights, and each communication of the plurality of communications being transmitted by a user device accessing an interface. The system also includes generating a queue to process the plurality of communications, the queue including a plurality of queue positions, each queue position of the plurality of queue positions being configured to store the request corresponding to a communication of the plurality of communications. The system also includes storing a group of requests for assigning one or more access rights, each request of the group of requests being stored in a queue position of the queue, and the group of requests including at least a portion of requests that correspond to the plurality of communications. The system also includes determining, during a defined time period, a frequency of collisions between requests of the plurality of requests, a collision being determined upon at least two requests requesting a same access right of the plurality of access rights within the defined time period. The system also includes determining a throttle factor based on the detected frequency of collisions, the throttle factor controlling a workflow associated with processing one or more queue positions of the plurality of queue positions, the workflow causing a modifiable rate of queue positions to be processed, and the modifiable rate being determined based at least in part on the throttle factor. The system also includes processing the plurality of queue positions according to the workflow, the processing including identifying one or more queue positions of the plurality of queue positions at the modifiable rate and enabling the user device associated with each queue position of the one or more queue positions to complete an assignment process for assigning one or more access rights to the user device. Other embodiments of this aspect include corresponding computer systems, apparatus, and computer programs recorded on one or more computer storage devices, each configured to perform the actions of the methods.

Certain embodiments of the present disclosure relate to a computer-implemented method including: storing a plurality of access rights to a resource, each access right of the plurality of access rights enabling access to the resource, and each access right of the plurality of access rights being unique from other access rights of the plurality of access rights. The computer-implemented method also includes receiving a plurality of communications, each communication of the plurality of communications corresponding to a request for assignment of one or more access rights of the plurality of access rights, and each communication of the plurality of communications being transmitted by a user device accessing an interface. The computer-implemented method also includes generating a queue to process the plurality of communications, the queue including a plurality of queue positions, each queue position of the plurality of queue positions being configured to store the request corresponding to a communication of the plurality of communications. The computer-implemented method also includes storing a group of requests for assigning one or more access rights, each request of the group of requests being stored in a queue position of the queue, and the group of requests including at least a portion of requests that correspond to the plurality of communications. The computer-implemented method also includes determining, during a defined time period, a frequency of collisions between requests of the plurality of requests, a collision being determined upon at least two requests requesting a same access right of the plurality of access rights within the defined time period. The computer-implemented method also includes determining a throttle factor based on the detected frequency of collisions, the throttle factor controlling a workflow associated with processing one or more queue positions of the plurality of queue positions, the workflow causing a modifiable rate of queue positions to be processed, and the modifiable rate being determined based at least in part on the throttle factor. The computer-implemented method also includes processing the plurality of queue positions according to the workflow, the processing including identifying one or more queue positions of the plurality of queue positions at the modifiable rate and enabling the user device associated with each queue position of the one or more queue positions to complete an assignment process for assigning one or more access rights to the user device. Other embodiments of this aspect include corresponding computer systems, apparatus, and computer programs recorded on one or more computer storage devices, each configured to perform the actions of the methods.

Certain embodiments of the present disclosure relate to a computer-program product tangibly embodied in a non-transitory machine-readable storage medium, including instructions configured to cause a data processing apparatus to perform operations including: storing a plurality of access rights to a resource, each access right of the plurality of access rights enabling access to the resource, and each access right of the plurality of access rights being unique from other access rights of the plurality of access rights. The computer-program product also includes receiving a plurality of communications, each communication of the plurality of communications corresponding to a request for assignment of one or more access rights of the plurality of access rights, and each communication of the plurality of communications being transmitted by a user device accessing an interface. The computer-program product also includes generating a queue to process the plurality of communications, the queue including a plurality of queue positions, each queue position of the plurality of queue positions being configured to store the request corresponding to a communication of the plurality of communications. The computer-program product also includes storing a group of requests for assigning one or more access rights, each request of the group of requests being stored in a queue position of the queue, and the group of requests including at least a portion of requests that correspond to the plurality of communications. The computer-program product also includes determining, during a defined time period, a frequency of collisions between requests of the plurality of requests, a collision being determined upon at least two requests requesting a same access right of the plurality of access rights within the defined time period. The computer-program product also includes determining a throttle factor based on the detected frequency of collisions, the throttle factor controlling a workflow associated with processing one or more queue positions of the plurality of queue positions, the workflow causing a modifiable rate of queue positions to be processed, and the modifiable rate being determined based at least in part on the throttle factor. The computer-program product also includes processing the plurality of queue positions according to the workflow, the processing including identifying one or more queue positions of the plurality of queue positions at the modifiable rate and enabling the user device associated with each queue position of the one or more queue positions to complete an assignment process for assigning one or more access rights to the user device. Other embodiments of this aspect include corresponding computer systems, apparatus, and computer programs recorded on one or more computer storage devices, each configured to perform the actions of the methods.

Additionally, certain embodiments of the present disclosure include a computer-implemented method. The method may include receiving, at a primary load management system, a communication from a user device, the communication corresponding to a request for one or more access rights to a resource. The primary load management system may manage assignment of access rights to resources. The method may also include determining a user identifier associated with the user device. The determination of the user identifier may be based on the communication. The method may include accessing one or more data points associated with the user identifier. Each data point of the one or more data points may correspond to an attribute associated with the user identifier. The method may include generating a resource-affinity parameter using the one or more data points. The resource-affinity parameter may represent a likelihood that a user associated with the user device will meet an objective. The resource-affinity parameter may be generated by inputting the one or more data points into a machine-learning model to output the resource-affinity parameter. The method may include determining a current system load, wherein the current system load represents a load of requests received at the primary load management system during a current time period. The method may include determining a first throttle factor based on the resource-affinity parameter and the current system load. The first throttle factor may control a first workflow associated with a resource. The method may include enabling the user device to query a plurality of access rights associated with the resource. The user device may be enabled to query the plurality of access rights as part of the first workflow controlled by the first throttle factor, and the query may include a constraint for querying the plurality of access rights.

The method may further include receiving a request for one or more access rights of the plurality of access rights associated with the resource; and determining a second throttle factor based on the resource-affinity parameter. The second throttle factor may control a second workflow associated with assigning the one or more access rights to the user device.

Certain embodiments may also include a system. The system may include one or more data processors; and a non-transitory computer-readable storage medium containing instructions which, when executed on the one or more data processors, cause the one or more data processors to perform operations including the method(s) described above and herein.

Certain embodiments may also include a computer-program product tangibly embodied in a non-transitory machine-readable storage medium, including instructions configured to cause a data processing apparatus to perform operations including the method(s) described above and herein.

Advantageously, according to certain embodiments of the present disclosure, large processing burdens (e.g., large numbers of users requesting access to the interface that enables them to query access rights) can be efficiently processed in a balanced manner (e.g., without overloading web servers or applications servers) by automatically throttling up or down the number of queue positions that are processed within a defined time period, so as to maintain a substantially similar or substantially consistent rate of collision (e.g., users requesting assignment of the same access rights).

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
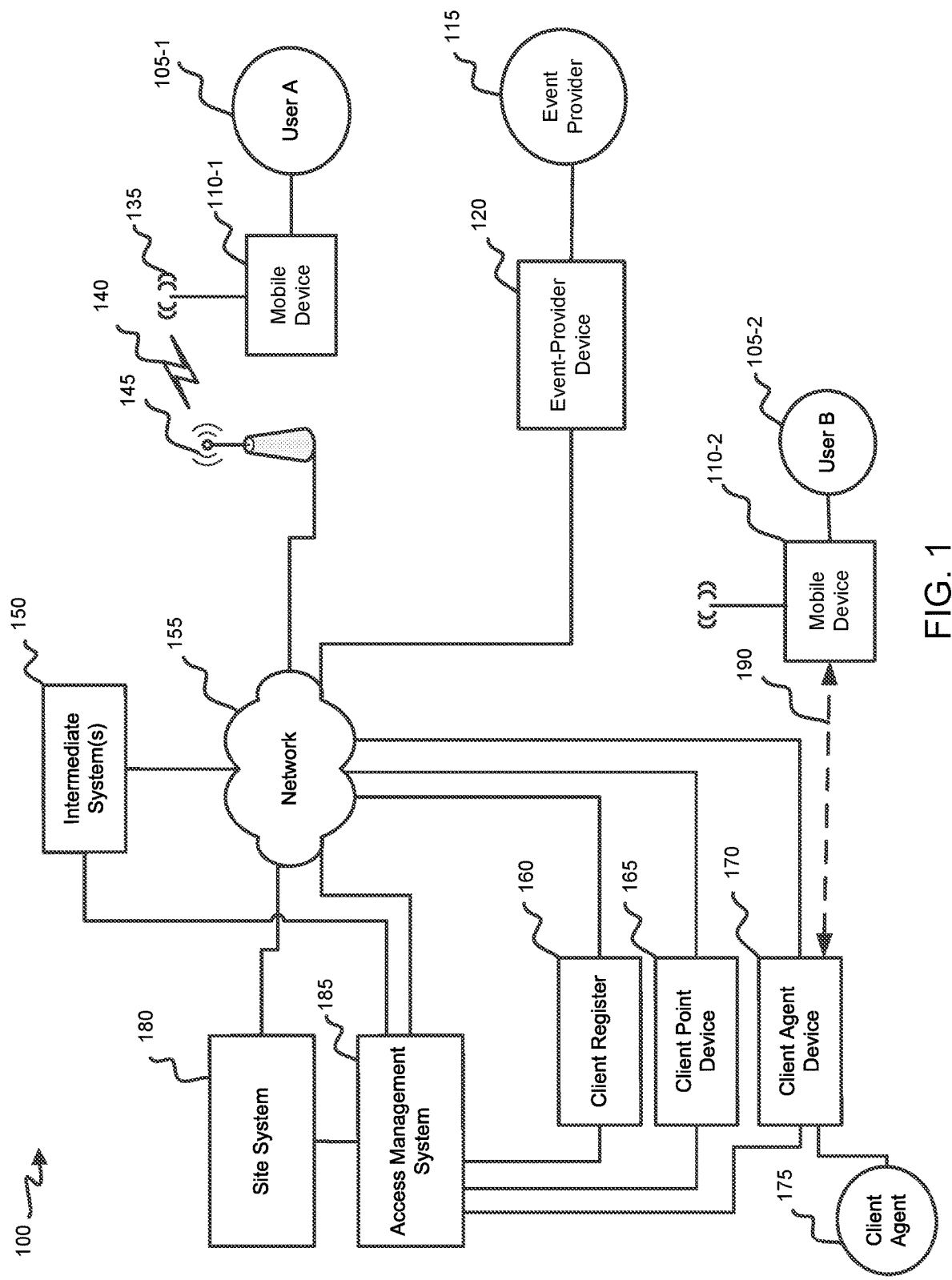
FIG. 1 depicts a block diagram of an embodiment of a resource access-facilitating interaction system.

Certain aspects and features of the present disclosure relate to systems and methods that generate machine-learning models to predict whether user devices will meet defined objectives. In some implementations, if a user device is predicted to meet an objective, a load management system can grant the user device access to resources, whereas, if a user device is predicted to not meet the objective, the load management system can deny access to the resources. An objective can be defined at a primary load management system that generates and manages the assignment of access rights to resources. Non-limiting examples of objectives may include accessing a resource during a defined time period, requesting additional items associated with a resource during the defined time period, reassigning access rights to secondary load management systems, reassigning access rights to another user device, association with additional user devices, and other suitable objectives.

In some implementations, the primary load management system can generate a machine-learning model, which can process one or more data points to output a result that can be used to predict a likelihood that a user device will meet an objective in the future. For example, a machine-learning model can evaluate user data (e.g., one or more data points) associated with a user device that is requesting assignment of an access right to a resource. The result (generated after processing the one or more data points using the machine-learning model) can be used to determine whether or not the user device is likely to access the resource during a defined time period. In some cases, a user device may be assigned an access right, but may ultimately not access the resource during the defined time period. Instead, the user device may transfer the access right to another user device or to a secondary load management system. If accessing the resource during the defined time period is the defined objective, then a user device does not meet that objective if the user device transfers the access right to another user device, for example. The one or more data points can include data associated with the user device. Further, the one or more data points may be factors or attributes associated with meeting the objective or not meeting the objective.

In some implementations, a semi-supervised model can be used to determine to what extent user devices (e.g., users associated with user devices or user profiles) are predicted to satisfy the defined objective(s). For example, user data (described in greater detail herein) associated with a particular user may be evaluated using a machine-learning model. The result of evaluating the user data using the machine-learning model may be a resource-affinity parameter. As a non-limiting example, user data may include various data points, which are inputted into a semi-supervised machine-learning model. The output of the semi-supervised machine-learning model may be a resource-affinity parameter (e.g., an integer or non-integer score or value, an array or matrix of values, a letter score, a numerical score, a score represented by a symbol, etc.). The resource-affinity parameter may represent a prediction of whether or not the user or user device associated with the inputted user data will meet the objective. In some cases, the resource-affinity itself may represent the prediction as to whether or not the user device will meet the objective. In some cases, the prediction may be determined by comparing the resource-affinity parameter to one or more threshold values or one or more threshold value ranges to determine whether the user is likely to meet the objective. It will be appreciated that unsupervised, supervised, ensemble techniques, and/or batch-learning models can be used instead of or in additional to semi-supervised models.

According to certain implementations, the primary load management system can assign access rights associated with a resource to user devices for which the resource-affinity parameter indicates a prediction to meet an objective (e.g., the user device will likely access the resource during a defined time period). Advantageously, the primary load management system can use the resource-affinity parameter to assign access rights to the user devices that will likely access the associated resource during the time period, and thus, avoid or reduce the chances of assigning access rights to user devices that may not ultimately access the resource during the time period. In some implementations, the primary load management system can identify that a particular access right with a particular characteristic or attribute is available to be assigned to user devices. Before allowing the particular access right to be queried by user devices for the purpose of requesting assignment, the primary load management system can determine one or more user devices that are predicted to meet the objective (e.g., based on the respective resource-affinity parameter), and automatically and/or tentatively assign the particular access right for those one or more user devices. In some implementations, the resource-affinity parameter can be generated for each user device (e.g., a user registered with the primary load management system) to determine a degree or extent to which the user device is predicted to meet the objective. Automatically and/or tentatively assigning the access right for a particular user device prevents that access right from being queriable by other user devices querying databases for the purpose of requesting assignment of access rights. In some cases, a workflow can be executed to automatically assign the access right to the particular user device. In some cases, the workflow can be executed to cause a communication (e.g., a text message using a Short Message Service (SMS) or a push notification using a native application) to be transmitted to the particular user device. The communication may include a link that, when selected, facilitates the completion of an assignment process for assigning the access right to the user device.

Advantageously, the embodiments described herein may provide a technical solution to the technical problem of overloaded servers and/or queues during time periods when access rights are available to user devices for assignment. Instead of processing requests for access rights (received from user devices) sequentially or in batches from a queue (which may cause servers to be overloaded when requests are received from user devices at a large scale, such as at big-data levels), the primary load management system can automatically and/or tentatively assign the access rights for user devices based on the resource-affinity parameter, which is calculated using machine-learning models before the time period when the access rights are available to user devices for assignment. Automatically and/or tentatively assigning the access rights for user devices based on the resource-affinity parameters can improve the usage of processing resources in networked systems because the user devices no longer need to request an assignment. Rather, access rights can be automatically and/or tentatively assigned for user devices without the user devices requesting assignment for the access rights, which reduces the number of communications received at the primary load management system. Thus, networked servers avoid being overloaded with requests, and access rights are assigned to user devices that will likely ultimately access the resource during defined time periods, rather than to user devices that are likely to transfer the access right to other user devices.

In some implementations, the primary load management system can compute a resource-affinity parameter for each user or user device registered with the primary load management system. The primary load management system can identify the highest resource-affinity parameter (or the group of resource-affinity parameters that are within a range), and determine the user associated with that resource-affinity parameter. Further, the primary load management system may transmit a communication (using a messaging system or service, such as an SMS provider, or a push notification using a native application) to a mobile device operated by the user associated with the highest resource-affinity parameter. The communication can include a notification that one or more access rights have been Automatically and/or tentatively assigned for the user for a temporary period of time (e.g., 15 minutes). If the user transmits a particular message back to the primary load management system (e.g., a text message including the word "YES") using the mobile device, the one or more access rights (e.g., electronic tickets) to a resource (e.g., an event) can be automatically assigned to the user. In these implementations, the access rights that are automatically and/or tentatively assigned to the users are not publically queriable or available for querying by other user devices that access an interface associated with the primary load management system. Further, if the user decides not to proceed with completing the assignment of the access right (e.g., the user does not text back "YES" within a defined time period), the primary load management system can iteratively identify another user with the next highest resource-affinity parameter and transmit the notification to a mobile device operated by that other user, and so on. Advantageously, iteratively assigning access rights to user devices can reduce the system load experienced at the primary load management system when access rights are available to be assigned to user devices, thereby providing an efficient process for load balancing processing resources within the network.

In some examples, the primary load management system may not automatically and/or tentatively assign an access right for the user with the highest resource-affinity parameter. In these examples, when an access right becomes available for assignment (e.g., available for purchasing by a user), the primary load management system may transmit a notification to one or more user devices. The one or more user devices may be operated by users associated with resource-affinity parameters above a certain threshold, for example, indicating that the users are likely to meet an objective. The notification may include a message that indicates the access right is available for assignment. In some implementations, the message may include a link to an interface that enables a user to enter a process to have that access right assigned to the user. For example, the link may be to a website associated with the primary load management system. In these examples, the user may be notified of the newly-available access rights and provided with an opportunity to complete an assignment process that assigns the access rights to the user before the availability of the newly-available access rights is publicly known. In some cases, the newly-available access rights may or may not be publically available for querying by other user devices accessing the primary load management system.

In some implementations, the resource-affinity parameter that is generated for each user (e.g., a user who is registered or who has not registered yet with the primary load management system) may indicate a degree to which the user is predicted to meet the objective. The resource-affinity parameter can be contextual to a specific resource (e.g., an event). For example, the resource-affinity parameter can be generated as a combination of a global parameter (e.g., a resource-affinity parameter representing the likelihood a user will access a resource generally) and a local parameter (e.g., a resource-affinity parameter representing the likelihood a user will access a specific resource, such as a particular event). The contextualization of resource-affinity parameters is described in further detail with respect to FIG. 13.

In addition, generating a resource-affinity parameter can include inputting one or more data points into a machine-learning model (e.g., a support vector machine (SVM)). Data points (e.g., user data) can include information about a user or user device and may be stored across one or more data stores. Non-limiting examples of data points can include a phone number, an email address, previous resource-access history (e.g., how many resources were previously accessed by this user or user device), previous assignment history (e.g., how many access rights were previously assigned to this user or user device), previous transfer history (e.g., how many times has this user or user device transferred an access right to another user or to a secondary load management system), affinities posted by the user on social media systems (e.g., "liked," "shared," or "favorited" the resource on a social media website), video or audio data streams associated with the user or user device (e.g., on a music platform), or any other suitable data point that can be used to predict a likelihood of meeting an objective. The data points associated with the user can be passed through the machine-learning model (e.g., a semi-supervised model) to generate a resource-affinity parameter for that user. The generated resource-affinity parameter can represent an affinity towards accessing resources generally or a specific resource. Further, the generated resource-affinity parameter can be evaluated to predict whether the user is likely to satisfy the objective or not. In some implementations, the machine-learning model can be generated using unsupervised, semi-supervised, or supervised machine-learning techniques. For example, the machine-learning model can be defined by labeling data points from a training data set (e.g., data points associated with or representing a population of users). To illustrate and as a non-limiting example, if the objective is defined as accessing a particular resource during a defined time period (e.g., the event time), the machine-learning model can include data points that are labeled to indicate a likelihood of accessing a resource (or alternatively, a likelihood of not accessing a resource, such as a likelihood of transferring the access right to another user device). The data points associated with the user can be passed through the machine-learning model and compared against the labeled data points to output a resource-affinity parameter (e.g., a value or score that can be used or compared against a threshold to predict whether the user will satisfy the objective).

In some implementations, when a user device initiates a process flow or workflow (e.g., a process flow for requesting assignment of an access right), the resource-affinity parameter associated with that user device can be evaluated to modify the process flow based on the value of the resource-affinity parameter. For example, when the user device initiates a process flow for requesting assignment of an access right, the process flow may be improved, optimized, or enhanced (e.g., by modifying processing delays to improve the speed of completing the process flow) when the user device is associated with a resource-affinity parameter that meets or exceeds a threshold, is within a threshold range, or that indicates a likelihood of meeting an objective. Conversely, when the user device initiates a process flow for requesting assignment of an access right, the process flow may be delayed or made slower (or certain steps of the flow may be removed) when the user device is associated with a resource-affinity parameter that does not meet or exceed a threshold, is outside a threshold range, or that indicates a likelihood of not meeting an objective.

In some implementations, modifying the process flow can include modifying a position of an assignment request in a queue based on the resource-affinity parameter associated with the user device. For example, during a time period when one or more access rights are available for assignment, and thus, available to be queried by user devices, the primary load management system may generate a digital queue of user requests for access-right assignment. For example, if a user device (that has not been queued yet) requests assignment of an access right to a resource, the primary load management system may retrieve or generate a resource-affinity parameter for the user to identify where to position the request in an existing queue of requests. If the resource-affinity parameter (e.g., as compared to a threshold) indicates that the user device is likely to access the resource (e.g., attend the event), then the user device may be positioned in an advantageous or beneficial position in the queue (e.g., at a queue position that will be processed earlier than others) so that the user can request assignment for more favorable access rights than other user devices (that may be associated with lower resource-affinity parameters).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as an entity or an entity operating a spatial region. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a spatial region of the resource (e.g., venue) during a time period for which the resource is accessible (e.g., event time). Mobile device 110-2 may directly interact with a client device (e.g., client agent device 170, client register 160 or client point device 165), which is also located at the spatial region during the time period in which the resource is accessible using access rights. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
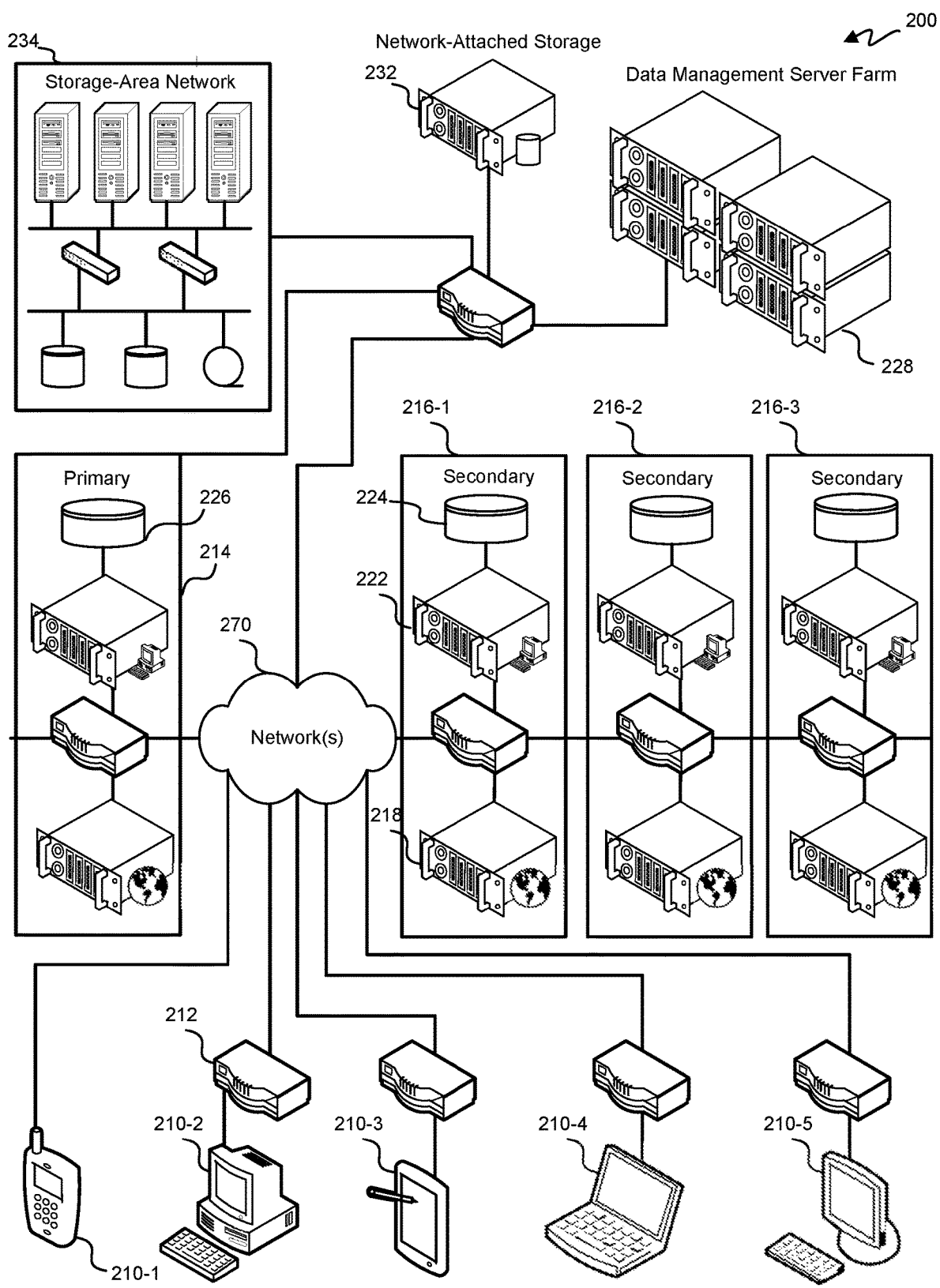
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of a profile, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
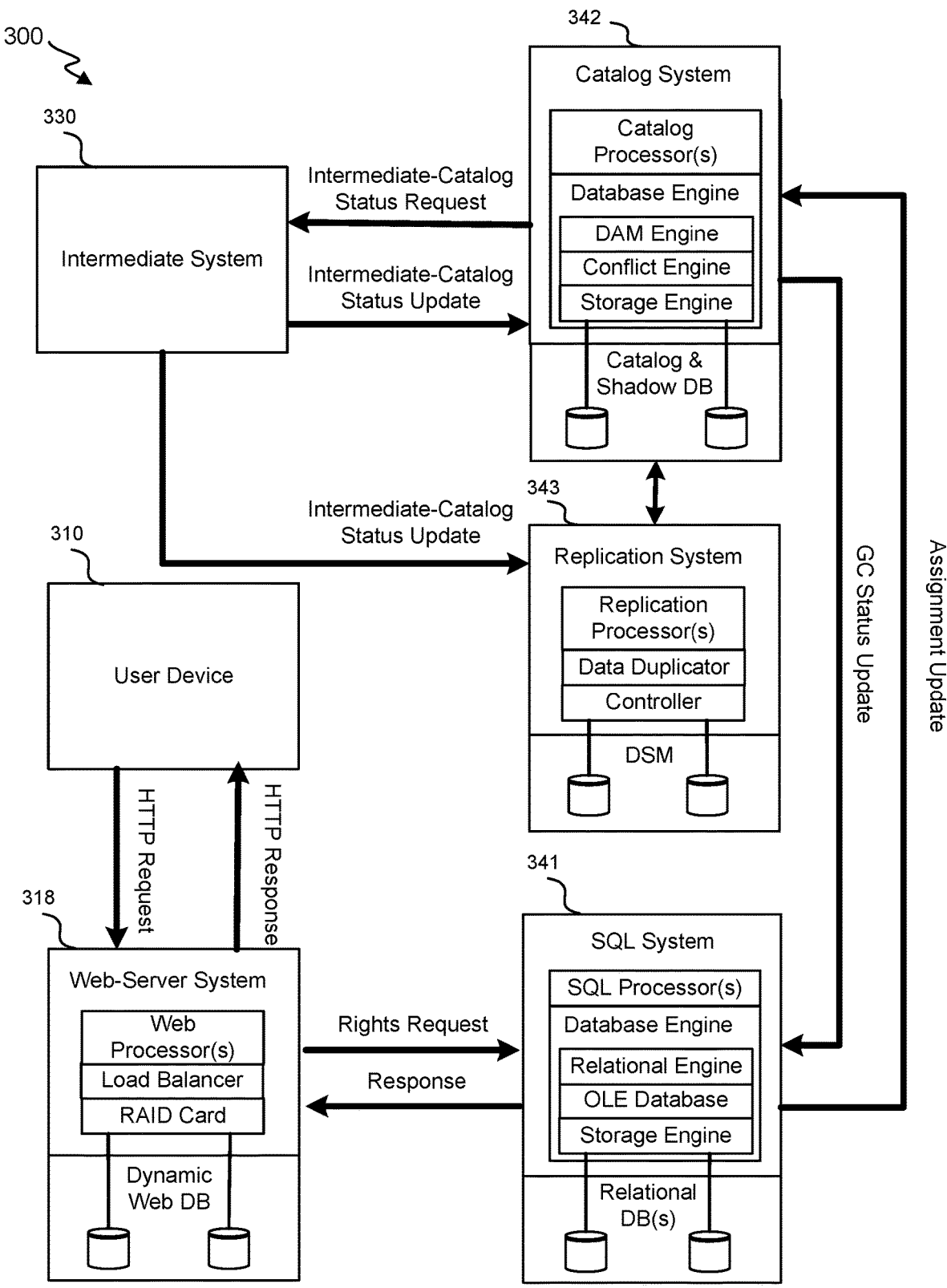
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user profile data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, profile and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information.

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of data-store queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic webpages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
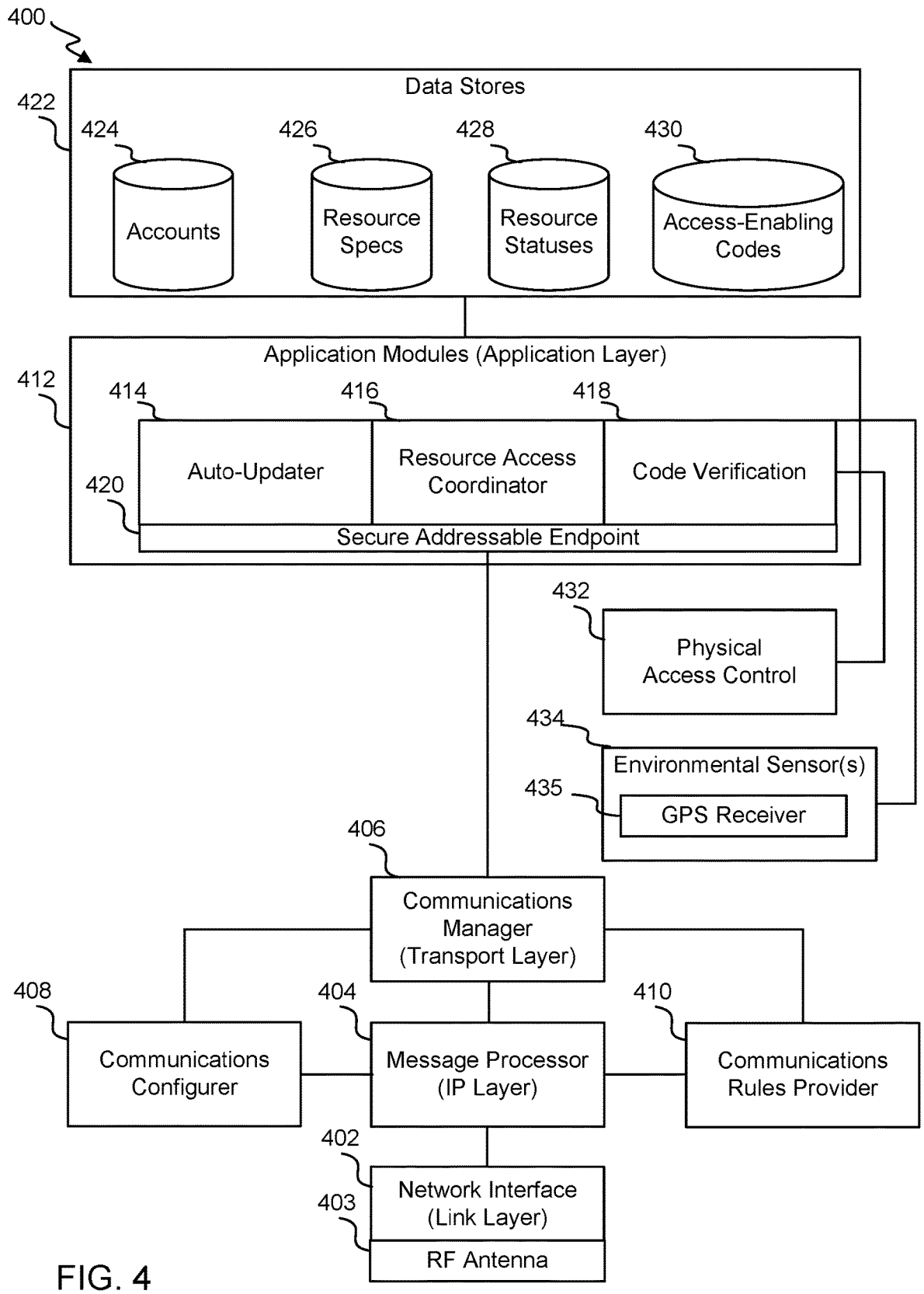
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource. As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting a check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as a profile data store 424, resource specification data store 426, resource status data store 428 and/or access-enabling code data store 430.

Profile data store 424 can store data for entities, such as administrators, intermediate-system agents and/or users. The profile data can include login information (e.g., username and password), identifying information (e.g., name, residential address, phone number, email address, age and/or gender), professional information (e.g., occupation, affiliation and/or professional position), and preferences (e.g., regarding resource types, entities, access right locations, and/or resource types). The profile data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a resource entity, and/or a spatial region of the resource. Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, automatically and/or tentatively assigned or was assigned a resource. In some instances, status information can indicate that a resource is being held or automatically and/or tentatively assigned and may identify an entity associated with the hold and/or a time at which the hold or reservation will be enabled to be queried.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for access rights to a particular resource can be unique relative to each other. In some instances, at least part of a code identifies a resource or specification of a resource.

One or more of data stores 424, 426, 428, and 430 can be a relational data store, such that elements in one data store can be referenced within another data store. For example, resource status data store 428 can associate an identifier of a particular access right with an identifier of a particular entity. Additional information about the entity can then be retrieved by looking up the entity identifier in profile data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
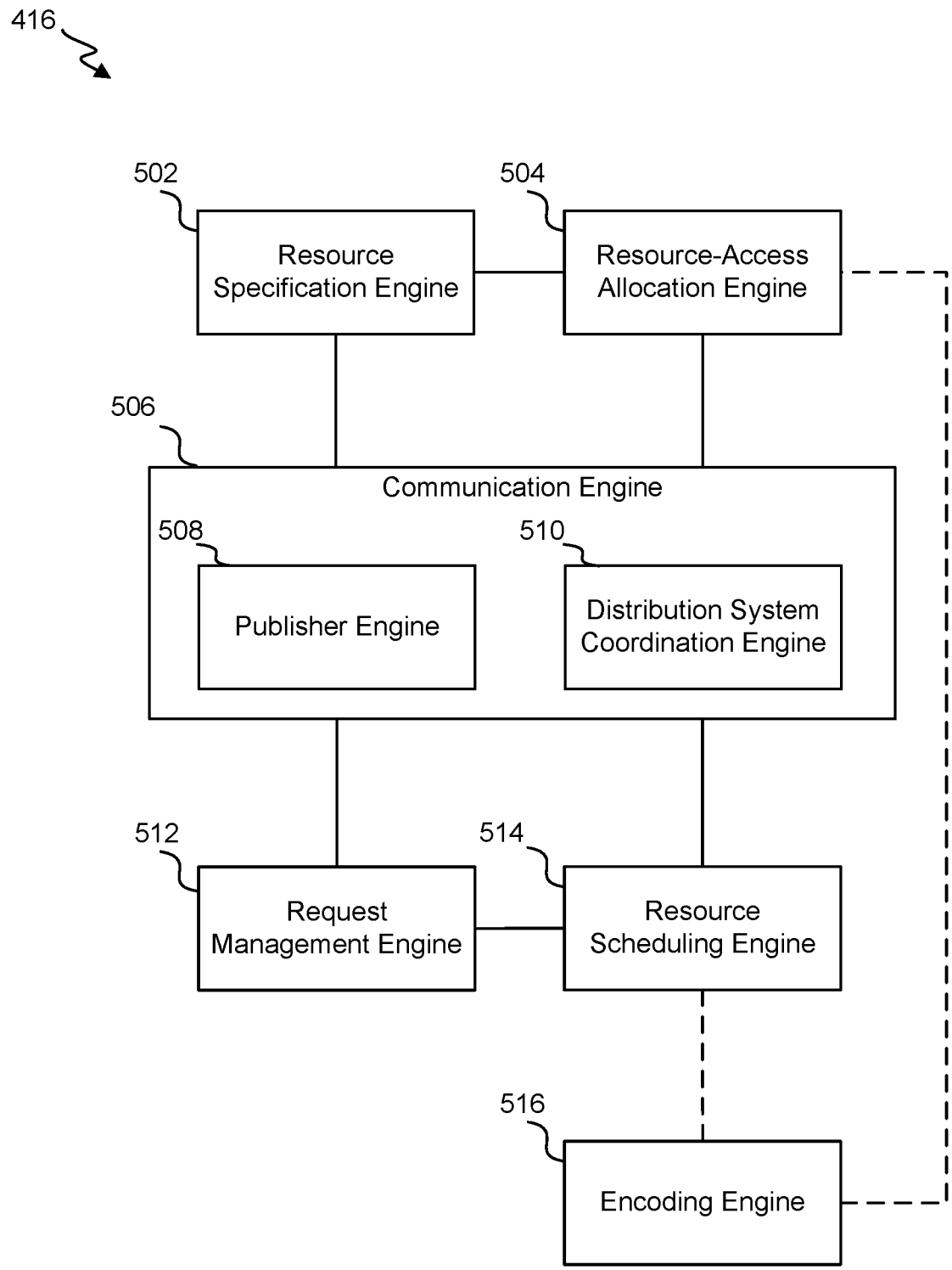
FIG. 5 illustrates example components of resource access coordinator module.

FIG. 5 illustrates example components of resource access coordinator module 416 that may operate, at least in part, at an access management system (e.g., access management system) according to an embodiment of the present disclosure. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or spatial region) of the resource. A specification can also or alternatively include one or more parties associated with the resource. Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on one or more steps of an assignment process or authorization thereof, an allocated access right can be initially unassociated with particular entities (e.g., users). For example, an allocated right can correspond to one or more access characteristics, such as an processor identifier, a usage time, a memory allocation, and/or a geographic location. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for Section 1 may be provided for a first intermediate system to assign, and access rights for Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information, and/or user device information (e.g., type of device, device identifier, and/or IP address).

When all required information has not been received, request management engine 512 can facilitate collection of the information (e.g., via an interface, app page or communication to an intermediate system). Request management engine 512 can also or alternatively execute or facilitate the execution of the assignment process, which includes one or more steps for completing an assignment of an access right to a user device or user profile. For example, publisher engine 508 may receive data inputted by the user via an interface, and request management engine 512 can request authorization to complete the assignment process. In some instances, request management engine 512 retrieves data from a user profile. For example, publisher engine 508 may indicate that a request for an access right has been received while a user was logged into a particular profile. Request management engine 512 may then retrieve, for example, contact information, device information, and/or preferences information associated with the profile from profile data store 424.

In some instances, request management engine 512 prioritizes requests, such as requests for overlapping, similar or same access rights received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests, whether requests were associated with users having established profiles, and/or whether requests were associated with inputs indicative of a bot initiating the request (e.g., shorter inter-click intervals, failed CAPTCHA tests).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining user confirmation) and/or to change a status of the access right(s) to indicate that they have been assigned (e.g., immediately, upon completing an assignment process or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a code (e.g., a 1-dimensional or 2-dimensional code), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a physical manifestation of an access right may be a document with an access code, and a copy of this document may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in profile data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment and/or to an intermediate system facilitating the assignment and/or having transmitted a corresponding assignment request. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user profile, and code verification module 418 can determine whether the code-identified device or profile matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable manner so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
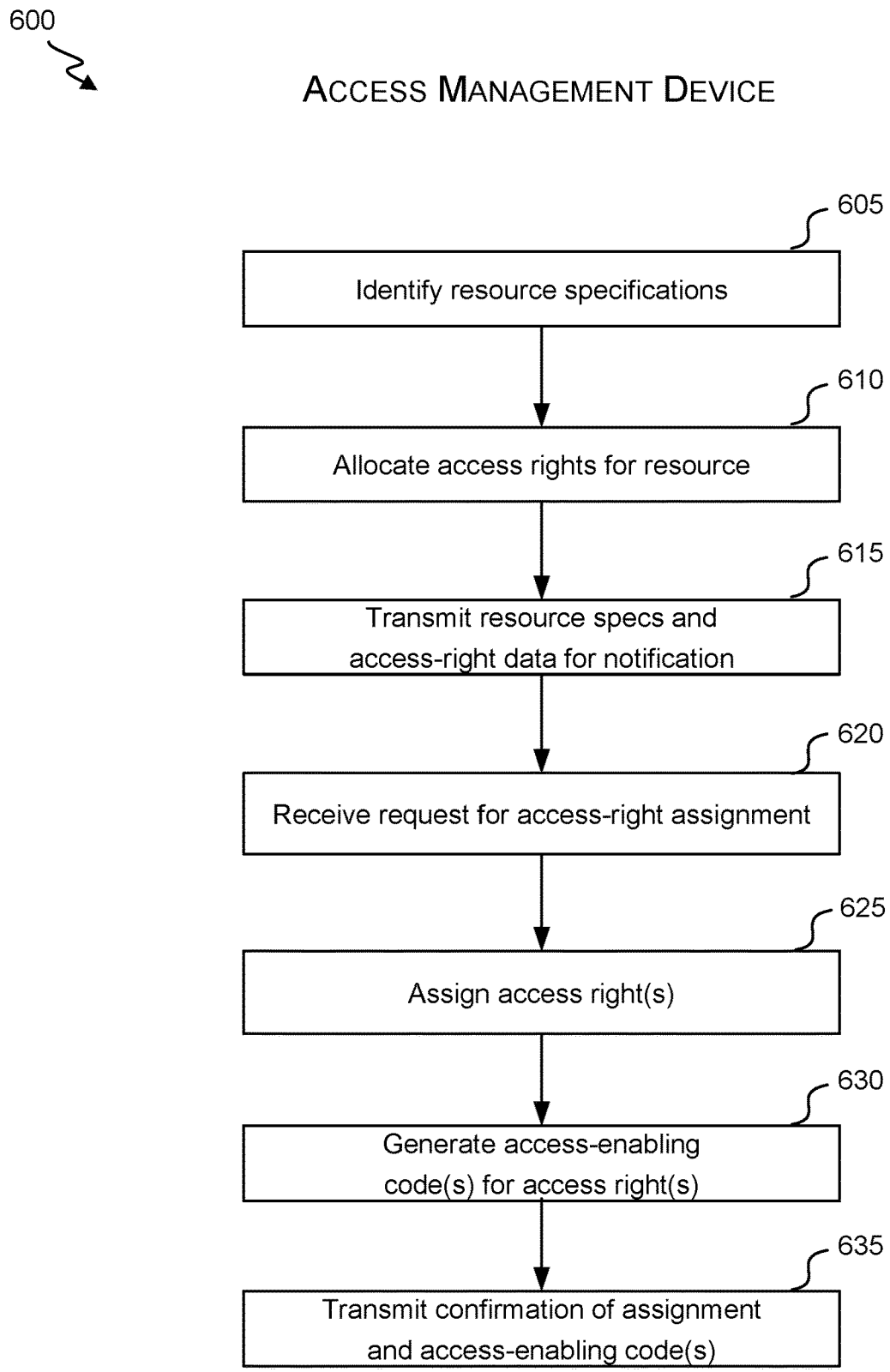
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether an assignment process has been completed. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
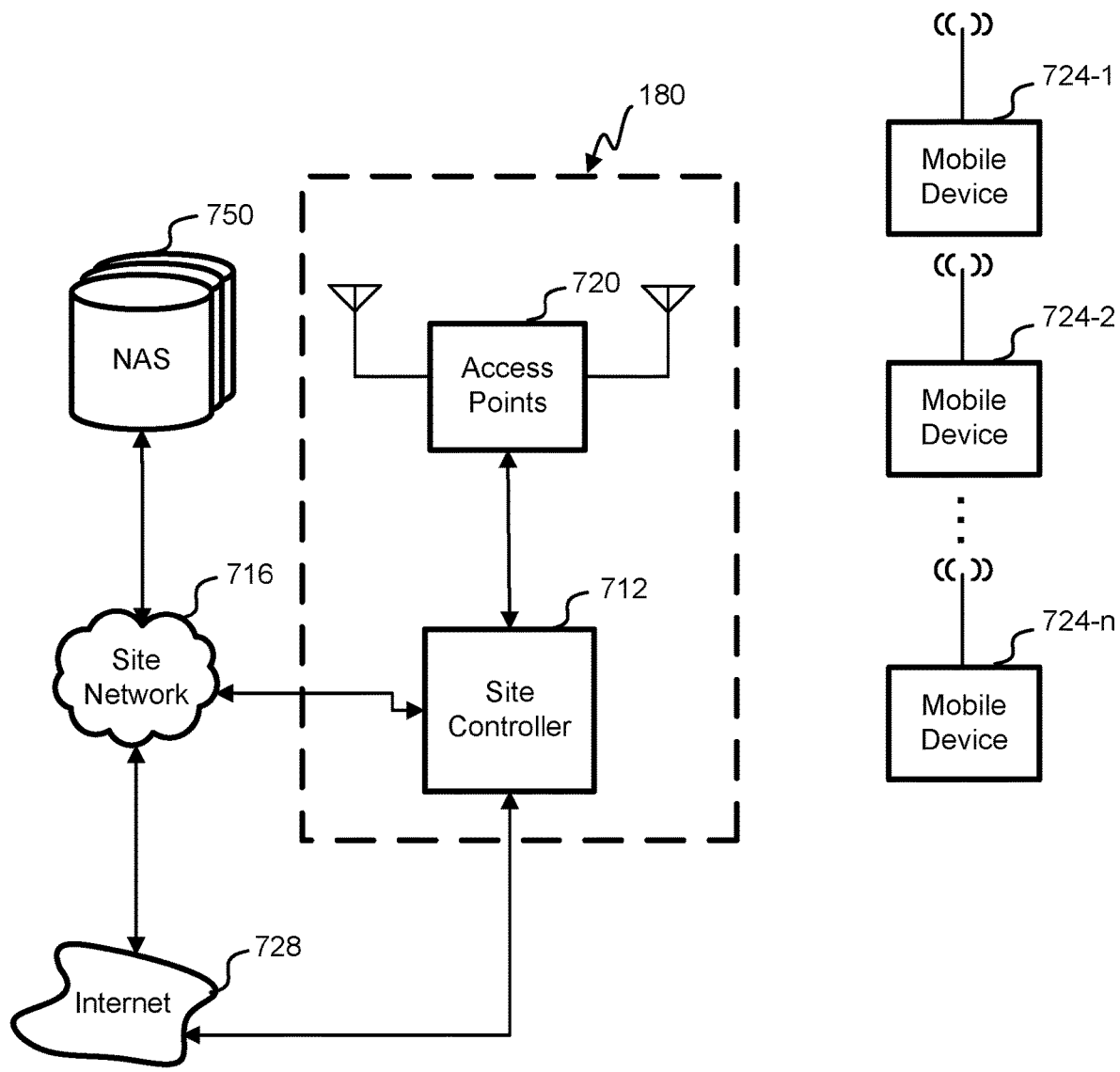
FIGS. 7A and 7B show embodiments of site systems in relations to mobile devices.

Referring to FIG. 7A, an embodiment of a site system 180 is shown in relation to mobile devices 724-*n*, Network Attached Storage (NAS) 750, site network 716 and the Internet 728. In some embodiments, for users located within the spatial region of the resource, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about the resource, videos, images, etc.) held by NAS 750. Additionally, as described herein, content can be gathered from users both before and during the time period the resource is accessible. By connecting to site network 716, mobile device 724 can send content for use by site system 180 or display content received from NAS 750.

Figure 7B:
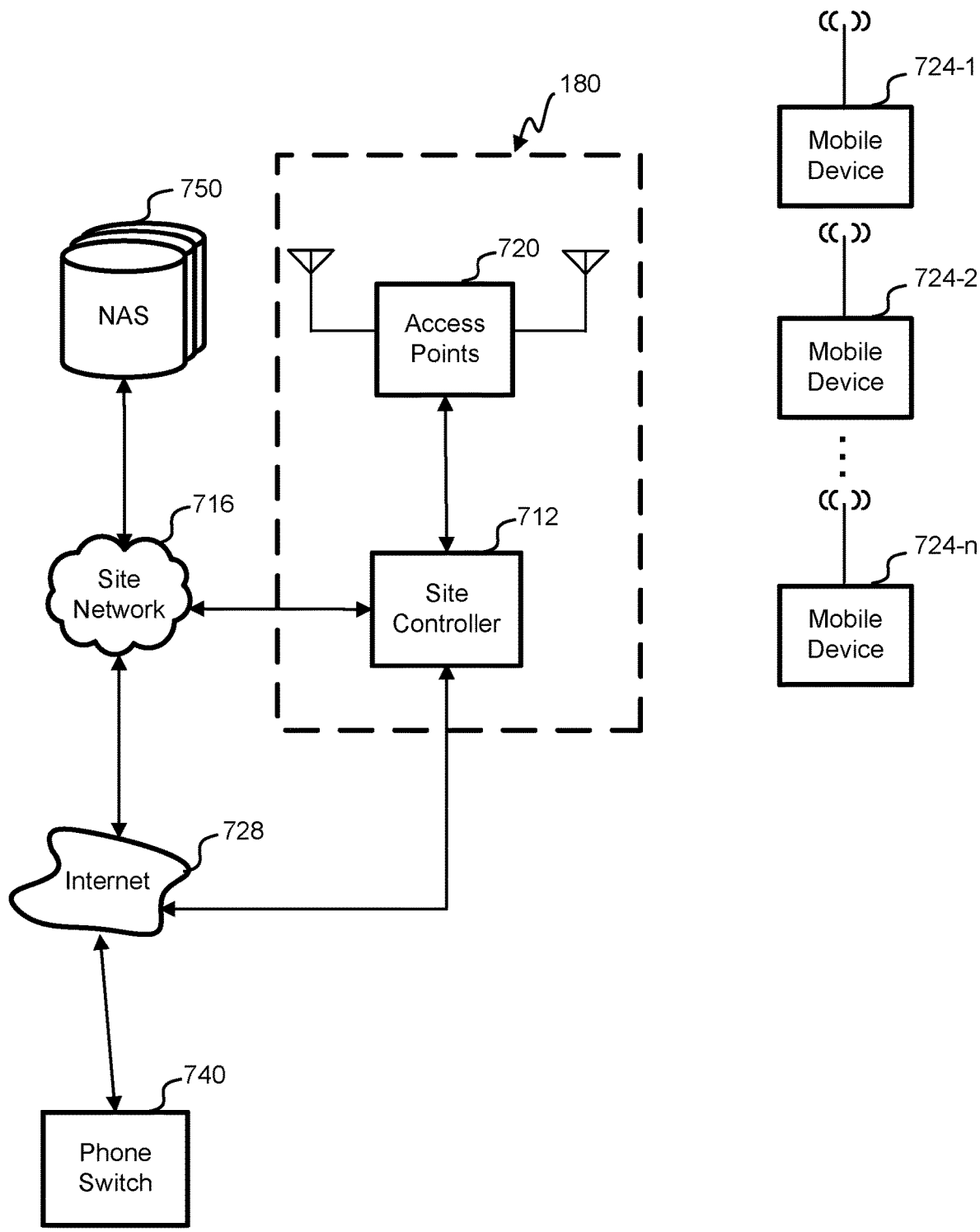

Referring to FIG. 7B, another embodiment of a site system 180 is shown in relation to mobile devices 724-*n*, Network Attached Storage (NAS) 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
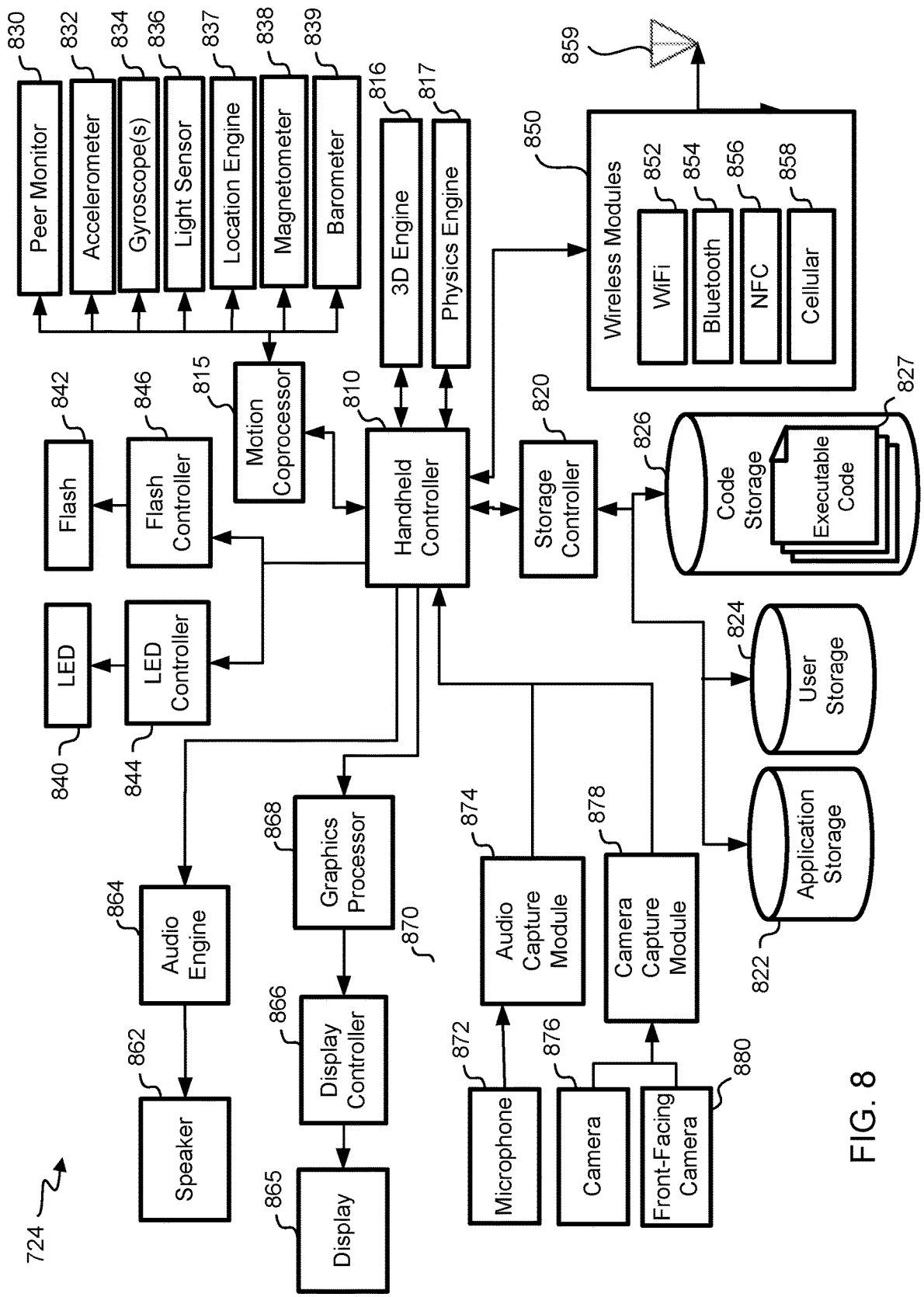
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data. User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
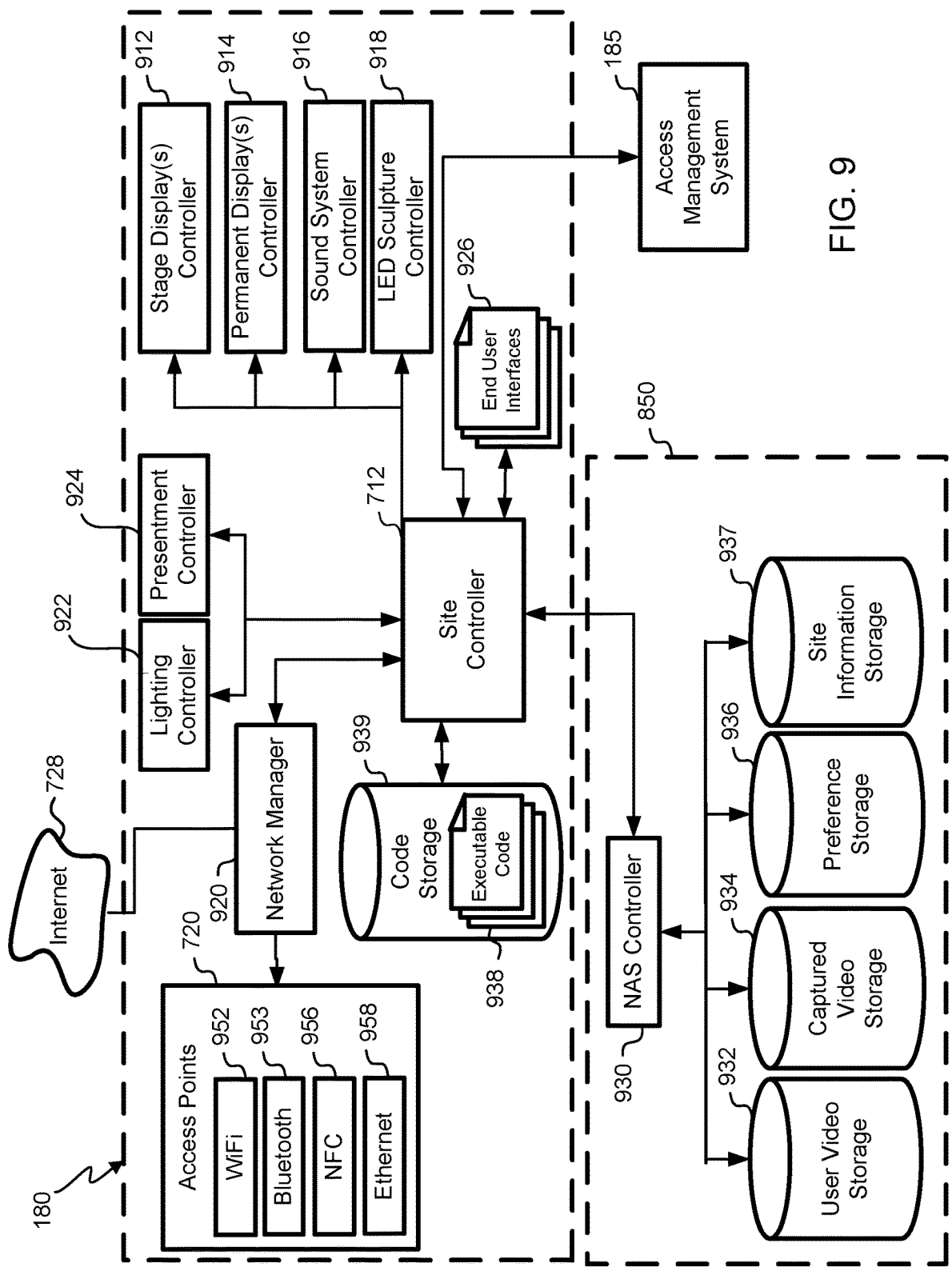
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of a spatial region associated with a resource. An access right grants access to the spatial region during a defined time period. A broad variety of features can be controlled by different embodiments, including: permanent lights (e.g., with lighting controller 922), lights (e.g., with presentment controller 924), display screens (e.g., with stage display(s) controller 912), permanent display screens (e.g., with permanent display(s) controller 914), and the sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., 3D models of site features and structure.

Figure 10A:
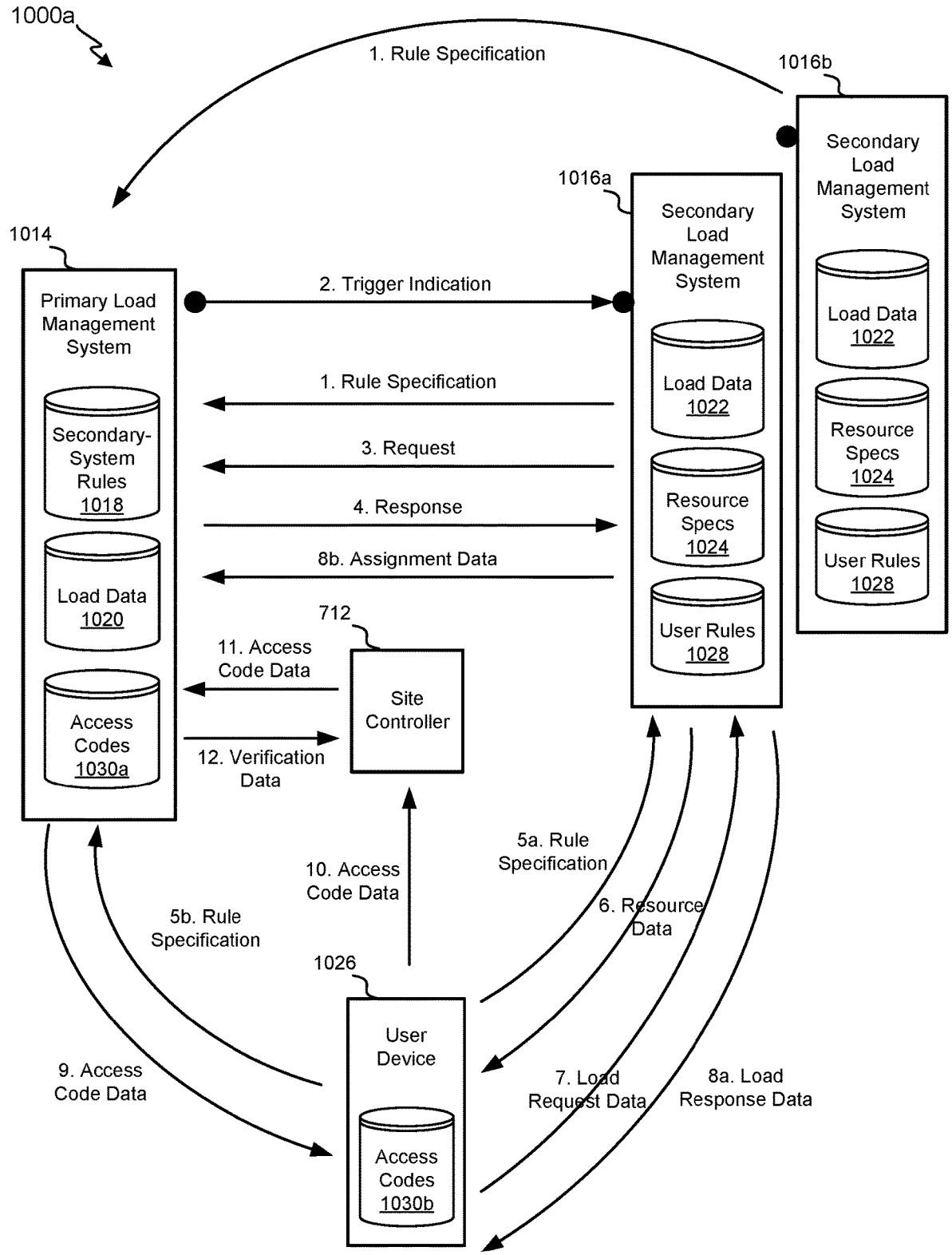
FIGS. 10A and 10B illustrate examples of communication exchanges involving primary and secondary load management systems.

Referring next to FIG. 10A, an example of a communication exchange 1000a involving primary load management system 1014 and each of a plurality of secondary load management systems 1016a, 1016b is shown. In some instances, secondary load management system 1016a is managed by an entity different than an entity that manages secondary load management system 1016b. Primary load management system 1014 may include and/or share properties with a primary assignment management system 214. Each of one or both of secondary load management system 1016a and 1016b may include or correspond to a secondary assignment system 216. Communications shown in FIG. 10 may be transmitted over one or more networks, such as network 270, the Internet and/or a short-range network.

In one instance, one of secondary load management system 1016a or 1016b is managed by a same entity as manages primary load management system 1014. In one instance, each of secondary load management system 1016 and 1016b is managed by an entity different than an entity managing primary load management system 1014. Primary load management system 1014 can include a system that, for example, manages a master access-right assignment data store, distributes access codes, performs verification data for access attempts, and so on. Secondary load management systems 1016a, 1016b can include systems that, for example, facilitate assignment of access codes to users. For example, secondary load management systems 1016a, 1016b can be configured to request allocation of access-right slots, which may result in a temporary or final allocation or assignment to the system, a hold on the access-right slots, and/or a distribution of data pertaining to the slot(s). Secondary load management systems 1016a, 1016b may then facilitate transmission of the access-right slots to one or more users and identify a user that has requested one or more particular access-right slots. The secondary load management system can then facilitate an assignment of the access-right slots by (for example) transmitting one or more access codes to the user device, identifying the user to primary load management system 1014 or updating assignment data.

Communication exchange 1000a begins with transmission of one or more rule specifications from each secondary load management system 1016a, 1016b to primary load management system 1014. The rule specification can include one or more request parameters identify parameters of a load requested for allocation. For example, a rule specification can include a specification pertaining to a size of a target load (e.g., corresponding to a number of access-right slots). The specification may include a particular number or a threshold. A rule specification can include a specification of a type of at least part of the load, such as one that identifies a resource or type of resource and/or one that identifies a characteristic of one or more access-right slots (e.g., a location). The specification may include a first allocation parameter that may identify a value for which access-right slots are being requested.

In some instances, a rule and/or request corresponds to a single resource, while in others, the rule and/or request corresponds to multiple resources. For example, a request may be for access-right results pertaining to each of three resources or to each resource available at a location in a season. Thus, in some instances, a rule specification identifies or is indicative of a number of resources. Resources may, but need not, be specifically identified in a rule specification, rule and/or request. For example, a rule specification may indicate that a defined number or range (e.g., 100-200) of access-right slots is requested for any given resource within a defined time period (e.g., year).

A rule specification can include an allocation parameter that identifies a parameter for allocating a load should it be allocated to the secondary load management system. To illustrate, secondary load management system 1016a, 1016b may be configured to receive allocations of access-right slots but to attempt to facilitate assignment of the access-right slots to users. Communication exchange 1000a can be configured so as to promote facilitated distribution to users upon allocation of access-right slots to a secondary load management system. Early provision of allocation parameters by a secondary load management system can promote such quick facilitated distribution.

For example, an allocation parameter can identify one or more communication channels (e.g., webpages, portals, information-distribution protocols, email addresses, etc.) for transmitting information pertaining to at least part of the load to each of one or more devices and/or an a second allocation parameter. This information may enable primary load management system 1014 to (for example) automatically provide information pertaining to allocated access-right slots via the communication channel(s) and/or to verify that allocation parameters comply with one or more primary-system rules (e.g., that may include an upper and/or lower threshold for an allocation parameter and/or limits on which communication channels may be used).

Primary load management system 1014 can define a rule for each secondary load management system 1016a, 1016b based on the rule specifications. The rules can be stored in a secondary system rules data store 1018.

Primary load management system 1014 can further include a load data store 1020. Load data store 1020 can include, for example, information pertaining to which access-right slots for a given resource are available and information pertaining to each of those slots. Load data store 1020 can further identify information pertaining to one or more defined loads, such as which access-right slots are corresponding to the load, to which secondary load management system a load has been allocated, whether an allocation includes any restrictions (e.g., time limits).

Primary load management system 1014 can assess whether a set of available access-right slots corresponds to request parameters identified in any secondary-system rules. For example, it can be determined whether a resource type corresponds to that specified in a request parameter, whether a quantity (and/or contiguous quantity) corresponds to that specified in a request parameter, whether a type of the access-right slots corresponds to that specified in a request parameter, and/or whether the quantity of access-right slots can be allocated for a value that corresponds to a first allocation parameter specified in a request parameter (e.g., the determination being based on defined values or thresholds associated with the access-right slots and/or a primary-system rule).

In some instances, it may be determined that request parameters identified in rules for multiple secondary load management system correspond to a same load or to a same at least part of a load. Primary load management system 1014 may include a switch, such as a content switch, that may evaluate a load, rules and/or systems to determine to which secondary load management system 1016a load is to be allocated or identified. In these instances, the rules and/or systems may be prioritized to determine to which entity the load is to be allocated. The prioritization may depend on, for example, defined prioritizations of the systems, a time at which rule specifications were submitted (e.g., prioritizing early submission), a size parameter (e.g., prioritizing either lower or larger size requests), and/or first allocation parameters (e.g., prioritizing larger first allocation parameters).

It will be appreciated that, in various instances, a load may be generated in response to evaluation of a load (e.g., in an attempt to define a load that accords with request parameters), or a load may be first defined (e.g., based on which access-right slots remain available and/or distribution priorities of the primary load management system) and it is then determined which rule to which the load corresponds. In some instances, a primary-system rule as to which access-right slots are to be included in a load and/or a secondary-system rule as to which access-right slots are requested may depend on information, such as an environmental characterization corresponding to a resource, a throughput monitor and/or a discrepancy associated with a resource (e.g., a spread or line associated with a resource). In some instances, a primary-system rule and/or secondary-system rule may include a function that relates an environmental characteristic, throughput characteristic and/or discrepancy with an allocation parameter (e.g., such that larger discrepancies, poorer environmental characteristics and/or lower throughput prospects result in lower allocation parameters).

When it is determined that a load corresponds to a secondary-system rule (and/or any prioritization is performed), primary load management system can transmit a trigger indication to the associated secondary load management system 1016a. The trigger indication may identify characteristics of the load (e.g., a size, type of one or more access-right slots, resource, and/or allocation value). In some instances, the trigger indication may identify a rule and/or what specifications were defined in the triggered rule.

In some instances, communication exchange 1000a is configured so as to provide a secondary load management system 1016a a defined time period for transmitting a request responsive to a trigger indication. Access-right slots may, but need not, be placed on hold for the time period. Should a request not be received within the time period, primary load management system 1014 may transmit a same or different trigger indication to another secondary load management system with a rule corresponding to the load or may redefine a load so as to correspond with a rule of another secondary load management system and transmit a trigger indication accordingly. In some instances, a trigger indication is simultaneously transmitted to multiple secondary load management systems 1016, and a load may be allocated to a system that thereafter requests the load (e.g., in accordance with a first-responder or other secondary-system selection technique).

Secondary load management system 1016a can then transmit a request communication back to primary load management system that requests the load. Primary load management system 1014 can then transmit a response communication that confirms that the load is being allocated. In some instances, the response communication is transmitted subsequent to or in temporal proximity of a time at which a charge is issued or collected for the load. In some instances, then response communication includes further information about the load. For example, location of access-right slots in the load may be more precisely identified.

Secondary load management system 1016a can store data pertaining to the load in a load data store 1022. Load data store 1022 may further track statuses of access-right slots so as to be able to identify which access-right slots have been assigned to users. Secondary load management system 1016a can further manage and/or have access to a resource specification data store 1024 that can associate identifiers of various resources with corresponding information. The resource specifications may be, for example, included in a trigger-information or response communication from primary load management system 1014; identified via an external search (e.g., web crawl), and so on. Resource specifications may include, for example, a location and/or a date and time.

A user device 1026 can also transmit rule specifications to one or more of primary load management system 1014 and 1016a. The rule specifications may include request parameters, such as a size specification, type specification and/or assignment value (e.g., that may be precisely identified or a threshold). When rule specifications are transmitted and/or availed to secondary load management system 1016a, a corresponding user rule can be defined for the user device and/or user.

Secondary load management system 1016a can distribute data of a resource (or multiple resources) corresponding to the load allocated to the system. The resource data can include one or more resource specifications stored at resource specification data store 1024. The resource data may further include data associated with one or more access-right slots included in the load. For example, the resource data may identify a time and location of a resource and a location of each of one or more access-right slots. In some instances, the resource data further includes an allocation parameter, such as the second allocation parameter and/or one defined based thereupon included in a secondary-system rule specification or included in a rule associated with secondary load management system 1016a.

In some instances, secondary load management system 1016a controls the transmission of the resource data to one or more user devices 1026. In some instances, primary load management system 1014 facilitates the transmission. For example, the data may be identified in an interface provided, controlled and/or managed by secondary load management system 1016a, but primary load management system 1016 may have authorization to update the webpage, and thus primary load management system can update the secondary-system to include the resource data.

In some instances, resource data is selectively transmitted to user devices. For example, resource data may be transmitted only to the user devices associated with user rules corresponding with at least part of the load.

User device 1026 can request assignment of at least part of the load. The user request can identify, for example, one or more access-right slots (e.g., and/or one or more resources). Secondary load management system 1016a can evaluate the request and respond with load response data. Such a response may be conditioned (for example) on confirming completion of the assignment process. The load response data may (for example) indicate that the assignment has been accepted and/or include confirmation data. Upon such acceptance, secondary load management system 1016a can also transmit assignment data to primary load management system. The load data can include an identification of the user device (or corresponding information, such as a name, email, profile, device identifier or phone number of a corresponding user) and/or one or more access-right slots being assigned. Primary assignment management system can update an assignment data store and/or load data store 1020 to reflect the assignment.

Primary load management system 1014 can then retrieve access code data from an access code data store 1030 and transmit the access code data to user device 1026. The access code data can correspond to the one or more access rights being assigned to the user. The access code data can be transmitted (for example) immediately, at a defined time (e.g., relative to a time of a resource), or upon receiving a request (e.g., triggered by a user input or detecting that a user device has crossed a geofence corresponding to a resource).

User device 1026 can store the access code(s) in an access-code data store 1030b. Subsequently, user device 1026 can retrieve the access-code data and transmitting it to a site controller 712 (e.g., upon detecting the site controller, upon receiving a request from the site controller or in response to detecting a corresponding user input). Site controller 712 can include one located at a resource location. Site controller 712 can transmit the access-code data to primary load management system 1014, which can then determine whether the code is a valid code, has not been previously redeemed and/or corresponds to one or more characteristics (e.g., a resource associated with or identified by the site controller, a time, a device characteristic, etc.). A result of such determination(s) can be transmitted back to site controller 712 such that a user can then be granted or denied requested access to a resource.

It will be appreciated that one, more or all communications represented in communication exchange 1000a can be transmitted via (for example) a web site, a web portal, another portal, an email exchange, a message (e.g., SMS message) exchange, and/or an API.

It will be appreciated that part or all of a communication exchange can be performed in an automated or semi-automated manner. For example, one or more rules (e.g., secondary-system rules or user rules) can be defined so as to trigger automatic allocation or assignment upon detecting data that corresponds to request parameters in the rules. As another example, the one or more rules can be defined so as to trigger a notification communication to the user device or secondary load management system that includes an alert that the request parameters are satisfied and enable to user device or secondary load management system to transmit a request for allocation or assignment.

It will also be appreciated that various modifications to communication exchange 1000a are contemplated. For example, in one instance, secondary load management system 1016a may at least partly manage access codes. For example, one or more access codes corresponding to a load may be transmitted from primary load management system 1014 to secondary load management system 1016a as part of a response. Secondary load management system 1016a may then transmit select access codes to a user device 1026, and (in various instances) either primary load management system 1014 or secondary load management system 1016a may provide verification of the code to site controller 712.

Figure 10B:
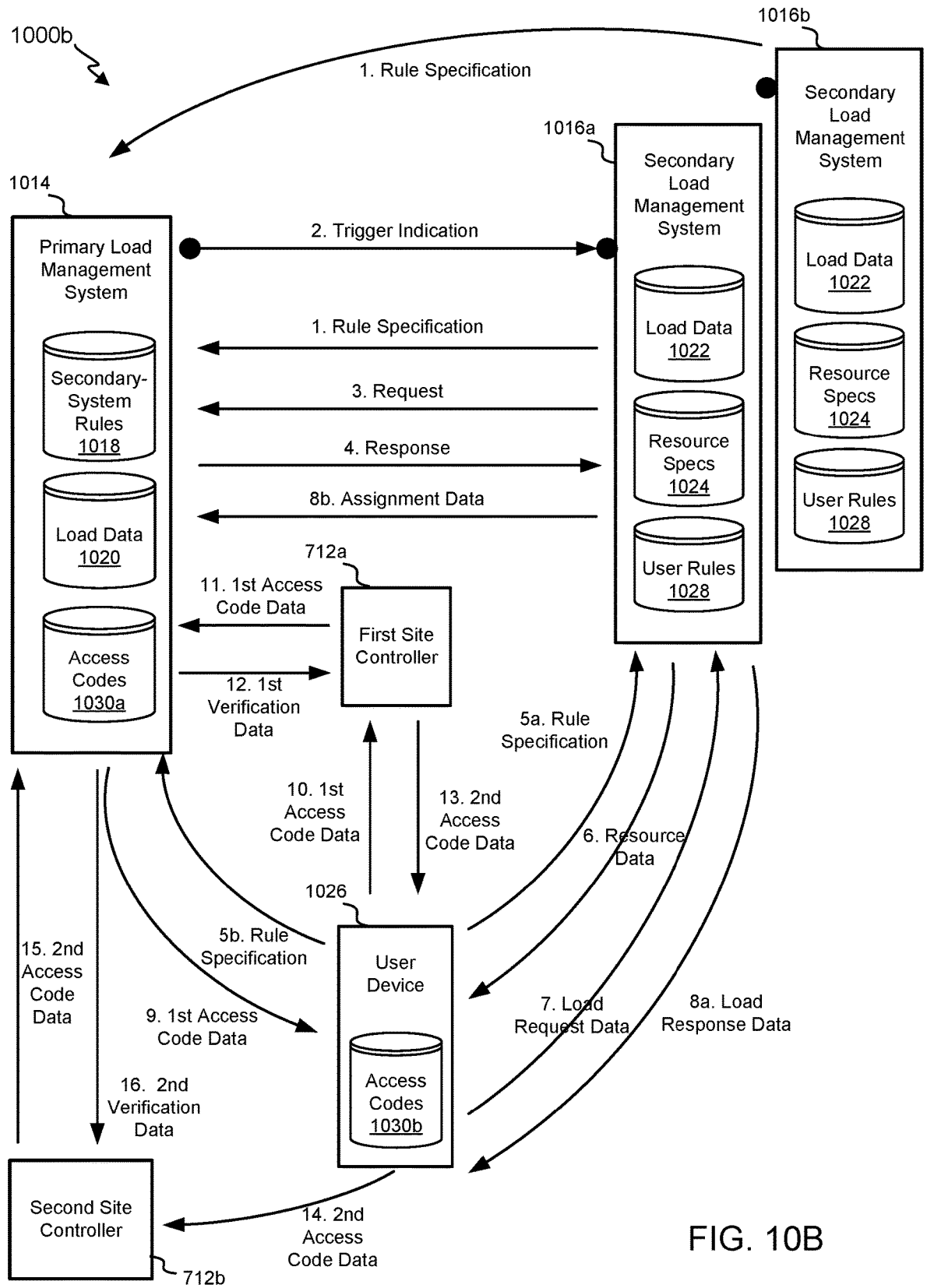

Referring next to FIG. 10B, another example of a communication exchange 1000b involving primary load management system 1014 and each of a plurality of secondary load management systems 1016a, 1016b is shown. In this instance, two different types of access code data are associated with an assignment.

As shown, in response to an initial assignment of an access-right slot, primary load management system 1014 transmits first access code data to user device 1026. The first access code data may include data representing that access to a resource has been authorized. However, in this instance, the first access code data may lack a precision of association that would associate the first access code data with one or more particular access characteristics. For example, the data may lack information that would identify a particular location within a resource area for which access is to be granted.

Subsequently (e.g., after a predefined time period, such as within a defined period from a resource time; and/or when a user device 1026 crosses a geofence corresponding to a resource, and/or when a user device 1026 receives input or a site-controller request indicating that access data is to be transmitted to a nearby site controller), user device 1026 may retrieve the first access code data and transmit it (e.g., via a short-range communication) to a first site controller 712a.

First site controller 712a may communicate with primary load management system 1014 to verify the data, in a manner similar to that described herein. Upon detecting that the first access code data has been verified, first site controller 712a can transmit second access code data to user device 1026. The second access code data have a precision of association that associates the data with one or more particular access characteristics. The second access code data may be, for example, generated at first site controller 712a or received from primary load management system (e.g., as part of the verification communication or as part of another communication). The particular access characteristics may be identified based on, for example, a technique described in U.S. application Ser. No. 14/063,929, filed on Oct. 25, 2013, which is hereby incorporated by reference in its entirety for all purposes. The particular access characteristics may be identified based on, for example, for which and/or how many access-right results first access code data had been previously verified and/or which and/or how many second access codes had been generated and/or transmitted.

The second access code data may indicate where access to a resource is authorized, and user device 1026 may thus move to a corresponding location. In some instance, a second site controller 712b is associated with the corresponding location. User device 1026 may then transmit the second access code data (e.g., when user device 1026 detects that it has crossed a geofence corresponding to the location and/or when user device 1026 receives input or a site-controller request indicating that access data is to be transmitted to a nearby site controller) to second site controller 712b. Second site controller 712b can determine whether the code is verified (e.g., valid, has not been previously used, and/or corresponds to the user device 1026 and/or location). The determination can include (for example) transmitting the second access code data to another device (e.g., primary load management system 1014, a local server, or another site controller, such as first site controller 712a) and receiving second verification data that indicates whether the second access code data is verified. The determination can, alternatively or additionally, include a local determination, which may be based (for example) on comparing the second access code data to data in a local access-code data store to determine whether there is a match and/or whether the second access code data (or corresponding access code data that is associated with same one or more particular characteristics) has been previously verified. The local access-code data store may be populated by second site controller 712b, for example, in response to communications from one or more other site controllers and/or primary load management system 1014 that identify second access code data that have been issued.

Figure 11:
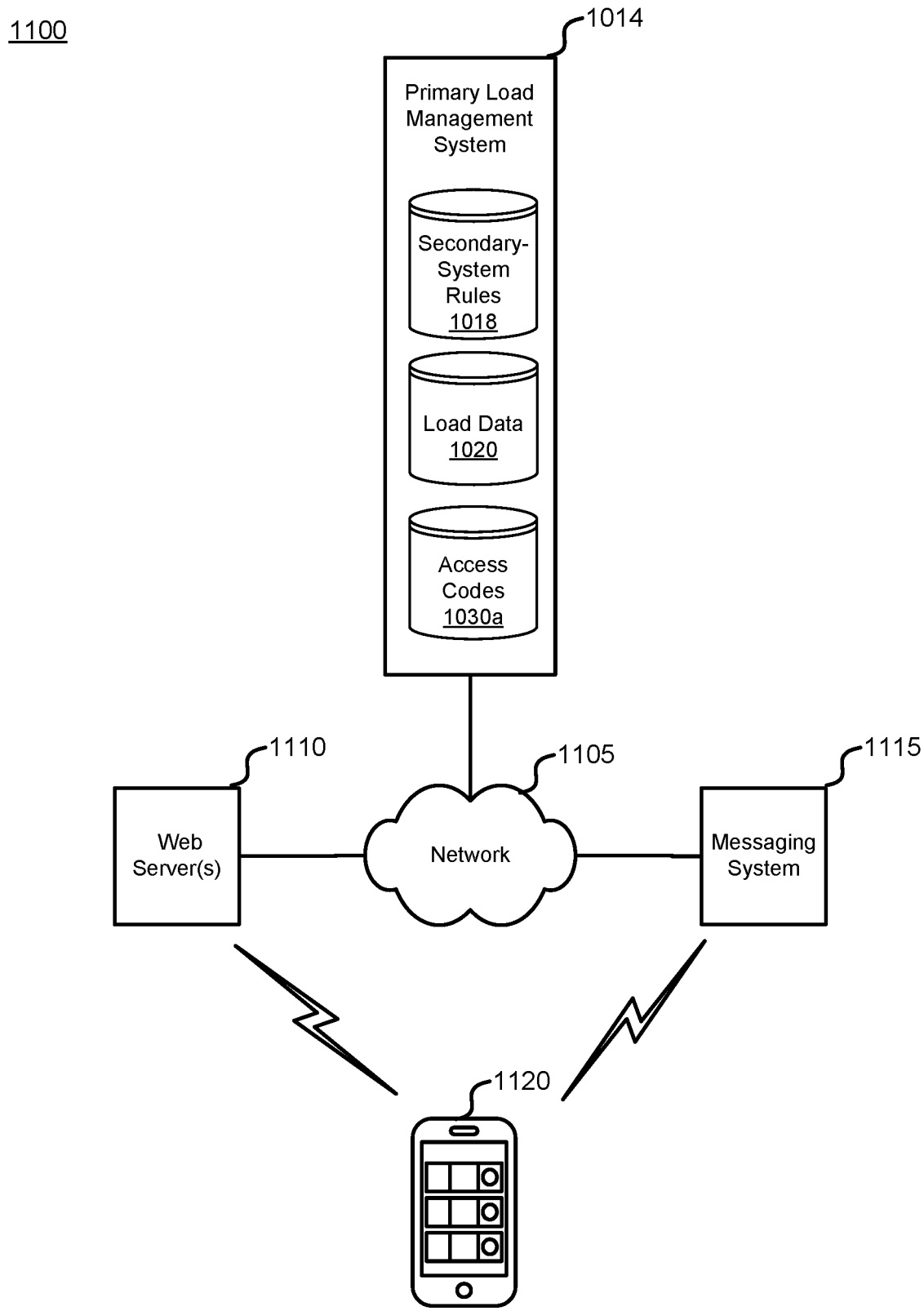
FIG. 11 is a block diagram illustrating a network environment for enabling access rights to be queried in a hierarchical manner based on resource-affinity parameters.

FIG. 11 is a block diagram illustrating a network environment for enabling access rights to be queried in a hierarchical manner based on resource-affinity parameters. FIG. 11 illustrates network environment 1100, which includes primary load management system 1014, web server 1110, messaging system 1115 (e.g., an SMS provider), and mobile device 1120. Primary load management system 1014 may be configured to communicate with web server 1110 and messaging system 1115 through network 1105. Network 1105 may be any public and/or private network connected to the Internet.

Web server 1110 may include one or more servers configured to host one or more webpages associated with the primary load management system 1014. For example, web server 1110 may host an access-right assignment webpage, which facilitates assigning access rights to users. Further, web server 1110 may also facilitate the assignment process for requesting assignment of one or more access rights that are publicly available to be queried by user devices.

Messaging system 1115 can include one or more servers that facilitate communications between primary load management system 1014 and mobile devices. For example, messaging system 1115 can implement a messaging service, such as SMS or push notifications, to communicate with mobile devices (e.g., smartphones).

Mobile device 1120 can be any end user device that is configured to be operated by a user. Examples of mobile device 1120 can include smartphones, tablet devices, laptops, or any mobile computing device. It will be appreciated that non-portable devices may also be included in network environment 1100, and as such, while mobile device 1120 is portable, the present disclosure is not limited thereto. Mobile device 1120 may be operated by a user. The user may operate mobile device 1120 to access the one or more webpages hosted by web server 1110 in order to query for and/or request assignment of access rights to a resource.

However, using a webpage to query for available (e.g., unassigned) access rights for the purpose of assignment to a user device may be slow and inefficient during times of high processing load (e.g., a large number of user devices are querying databases for available access rights). Accordingly, in some implementations, mobile device 1120 may be registered with primary load management system 1014 in order to avoid having to request assignment of access rights using the webpages described above. In these implementations, the user may define a profile with primary load management system 1014, and the profile can include one or more characteristics of the user or settings defined by the user. For example, the profile can include a phone number that can be used to communicate with mobile device 1120. According to example embodiments of the present disclosure, the user operating mobile device 1120 can avoid the challenges of requesting access rights using the webpage during times of high request loads. For instance, when an available access right that satisfies predetermined conditions (defined by the user in the profile), then the access right may be automatically and/or tentatively assigned to the user. When the access right is released (e.g., available for assignment), the primary load management system 1014 may transmit one or more signals to messaging system 1115. The one or more signals may include instructions that cause the messaging system 1115 to transmit a message to mobile device 1120 using a messaging service (e.g., SMS). In some implementations, the message may include a notification that one or more access rights have been automatically and/or tentatively assigned to the user. The user may transmit a message back to the primary load management system 1014 using the messaging system 1115 (e.g., by responding via text message). For example, the user may respond with a keyword (e.g., "YES") to indicate that the user seeks to proceed with requesting assignment of the access right. If the user does not want to complete the request for assignment of the automatically and/or tentatively assigned access right, the user can either not respond or respond with a predefined keyword, such as "NO" (e.g., in which case the reservation of the access right will expire and the access right will be automatically and/or tentatively assigned to the user with the next highest resource-affinity parameter). The user may have a predefined amount of time to respond (e.g., 5, 10, 15 minutes). When the user transmits the message indicating that the user would like to request assignment of the access right (e.g., by transmitted a message with the text "YES"), the primary load management system 1014 can automatically assign the access right on behalf of the user.

It will be appreciated that the message can also include a notification that the access right is available without reserving the access right for the user. In this case, the user can log into the access-right assignment system associated with primary load management system in order to request assignment of the access right.

Figure 12:
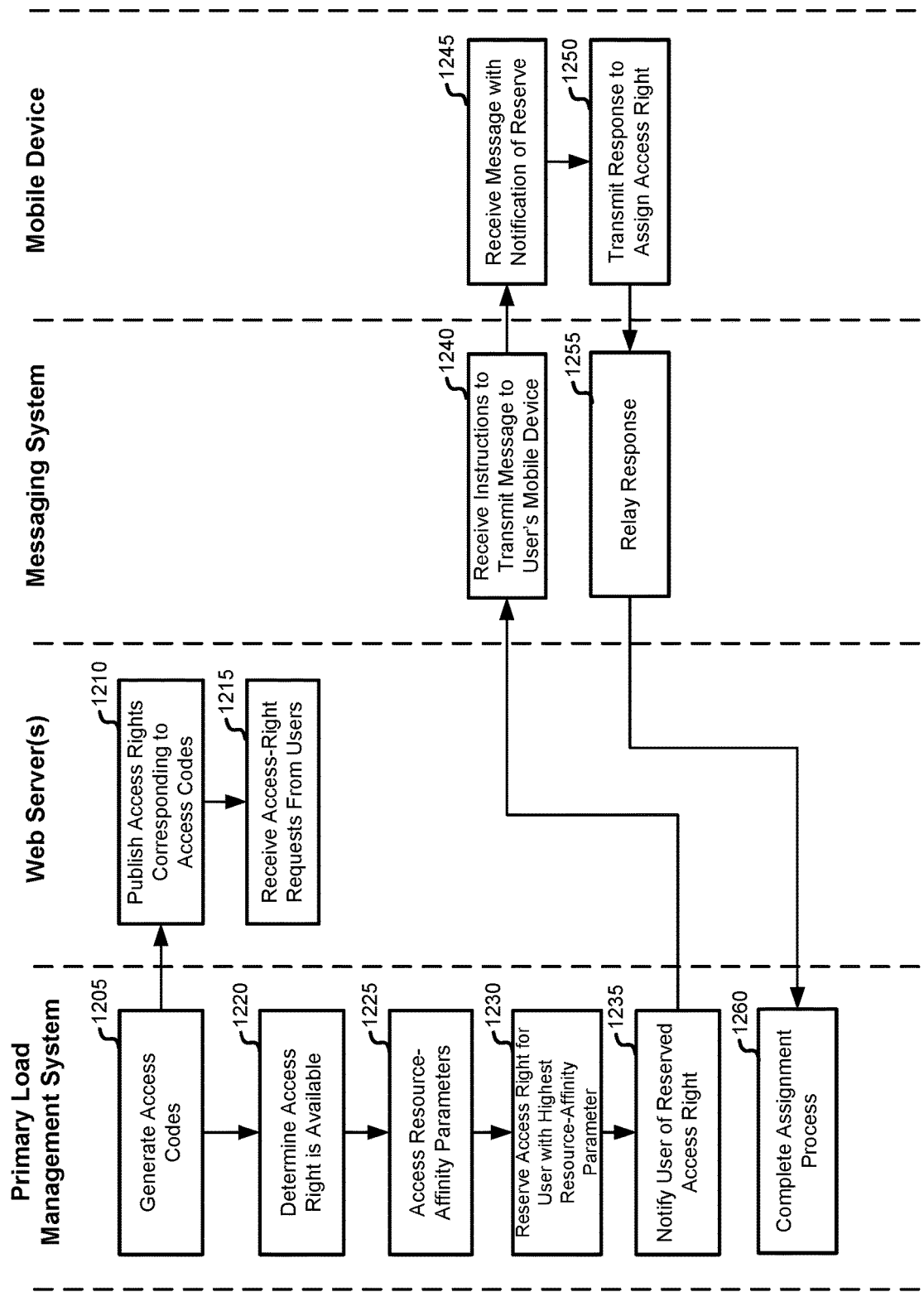
FIG. 12 is a swimlane diagram illustrating an example data flow of the network environment of FIG. 11.

FIG. 12 is a swimlane diagram illustrating an example data flow 1200 of the network environment of FIG. 11. Data flow 1200 can include one or more communications between the primary load management system, the web server, the messaging system, and the mobile device (for example, as illustrated in FIG. 11). Data flow 1200 begins at block 1205 where the primary load management system generates unique access codes (representing unique access rights to a resource). At block 1210, the access rights that correspond to the generated access codes are queriable though an interface that can facilitate access to the web server. When the access rights are available or enabled to be queried by user devices, they become searchable using the interface (e.g., at block 1215). Further, when the access rights are available or enabled to be queried by user devices, the access rights are also available to be assigned to user devices requesting assignment of the access rights. For example, a particular user device can query for access rights that satisfy a certain constraint (e.g., a location of the access right or resource), and then the user device can request that the access right(s) that result from the query be assigned to the user device. The user device may have to complete an assignment process to have the access right(s) assigned to the user device. However, when access rights are accessible for querying, the databases that store the access rights often experience durations of high load around the time when the access rights are initially available to be queried. Example embodiments described in the present disclosure (e.g., in blocks 1220-1260) are provided to address the technical problem of databases overloaded with user requests.

At block 1220, access rights that are not yet enabled to be queried may be identified. For example, in certain cases, a subset of a set of access rights may be initially assigned to an entity associated with the resource before the set of access rights are available to be queried by user devices. If one or more access rights included in the subset of access rights are not re-assigned from the entity to another user device before a particular time period associated with the resource, the one or more access rights that were not re-assigned may be enabled to be queried by user devices (e.g., the general public). However, in certain embodiments, instead of enabling the one or more access rights of the subset of access rights to be queried by user devices, the primary load management system may automatically assign the one or more access rights to certain user devices that satisfy a predefined objective (e.g., user devices associated with users who are predicted as being likely to ultimately access the resource during a defined time period).

At block 1225, the primary load management can access the resource-affinity parameter for each user device that has previously registered with the primary load management system. The resource-affinity parameter may be stored in a data store associated with the primary load management system. At block 1230, the primary load management system may identify the user with the highest resource-affinity parameter (e.g., the user whose resource-affinity parameter indicates the greatest likelihood of meeting an objective as compared to other the resource-affinity parameters of users), from amongst all resource-affinity parameters of various users, and automatically and tentatively assign the one or more access rights to that user. In some examples, automatically and/or tentatively assigning an access right may be implemented by storing a hold instruction in association with the one or more access rights for a predefined period of time (e.g., 5, 10, 15 minutes). Storing a hold instruction in association with the one or more access rights indicates to the primary load management system that the access right is (at least temporarily) no longer queriable by user devices or searchable through the interface for the predefined period of time. Further, the hold instruction allows the user to determine whether or not he or she would like to be assigned to the one or more access rights. The hold instruction also provides the user with the time to complete the assignment process. The hold instruction causes the primary load management system to automatically provide the user with the chance to request assignment of the one or more access rights before the one or more access rights are accessible for querying by other user devices (e.g., the public).

At block 1235, the primary load management system can transmit a notification signal to the user device with the highest resource-affinity parameter (or the user device associated with the resource-affinity parameter that indicates the greatest likelihood of meeting an objective). The notification signal can cause the user device to be notified that an access right has been automatically and/or tentatively assigned (e.g., temporarily reserved) to the user device. For example, transmitting the notification signal can include generating an instruction that is transmitted to the messaging system. When the instruction is received at the messaging system, the instruction can cause the messaging system to generate and transmit a text message to the mobile device associated with the user. The text message can include a message indicating that an access right has been automatically and/or tentatively assigned to the user device (and is not available to be queried by other user devices), and that the user can request assignment of the access right by responding with a keyword (e.g., "YES"). In some examples, the text message can also include a disclaimer that the tentatively assigned access right is only temporarily assigned for a predefined time period (e.g., 5, 10, 15 minutes), and that after that time period, the access right will no longer be assigned to the user. At block 1240, the messaging system can receive the instruction and generate a text message for the mobile device. At block 1245, the mobile device can receive the text message and the text message can be displayed on the mobile device. It will be appreciated that the message may be transmitted to the mobile device and presented on a native application that is running on the mobile device. For example, the message can be a push notification that is presented on the mobile device using the native application. It will be appreciated that the message can include any text, and thus, the present disclosure is not limited to the message content described above.

At block 1250, if the user decides to proceed with requesting assignment of the one or more access rights, the mobile device can receive input corresponding to the user's decision. As only a non-limiting example, the user can type in "YES" into the text message application running on the mobile device and send the message in response to the notification received at block 1245. Alternatively, if the user decides not to request assignment of the access right, the user can ignore the message or respond in the negative (e.g., respond with a text message of "NO"). In these examples, the user has a predetermined period of time (e.g., 5, 10, 15 minutes, etc.) to decide and respond for the access rights. The initial message received at block 1245 may indicate that the reservation of the access right will expire after a predetermined time period. At block 1255, the message transmitted by the mobile device (in the case of the user accepting to request assignment of the access rights) may be received at the messaging system and relayed to the primary load management system. It will be appreciated that the messaging system can receive the text message response from the mobile device, transform the test message into one or more signals that can be transmitted over the network (e.g., network 105), and then relay the one or more signals to the primary load management system.

At block 1260, the primary load management system receives the instruction to assign the access right. The primary load management system can then access the user's profile to obtain the data needed to complete the assignment process. The option to assign access rights in the manner described in process 1200 may only be available to users who have completed their profiles. It will be appreciated that the steps of transmitting a notification and receiving an instruction (e.g., blocks 1235-1250) may be removed from process 1200. In some examples, one or more access rights may be automatically assigned to users based on the users' resource-affinity parameters. For instance, an access right may be assigned to the user associated with the resource-affinity parameter that indicates the greatest likelihood of meeting an objective as compared to other users. The primary load management system may iteratively assign access rights (e.g., without requiring that the user device transmit instructions to assign the access rights to the primary load management system) to the users by assigning access rights to users with the greatest likelihood of meeting an objective, and iteratively, assign access rights to users with the next greatest likelihood of meeting the objective. It will be appreciated that the primary load management system may select access rights to automatically assign to users by accessing the profile associated with a user to identify one or more constraints for querying access rights (e.g., a location of an access right or resource preferred by the user and indicated in the user's profile).

Figure 13:
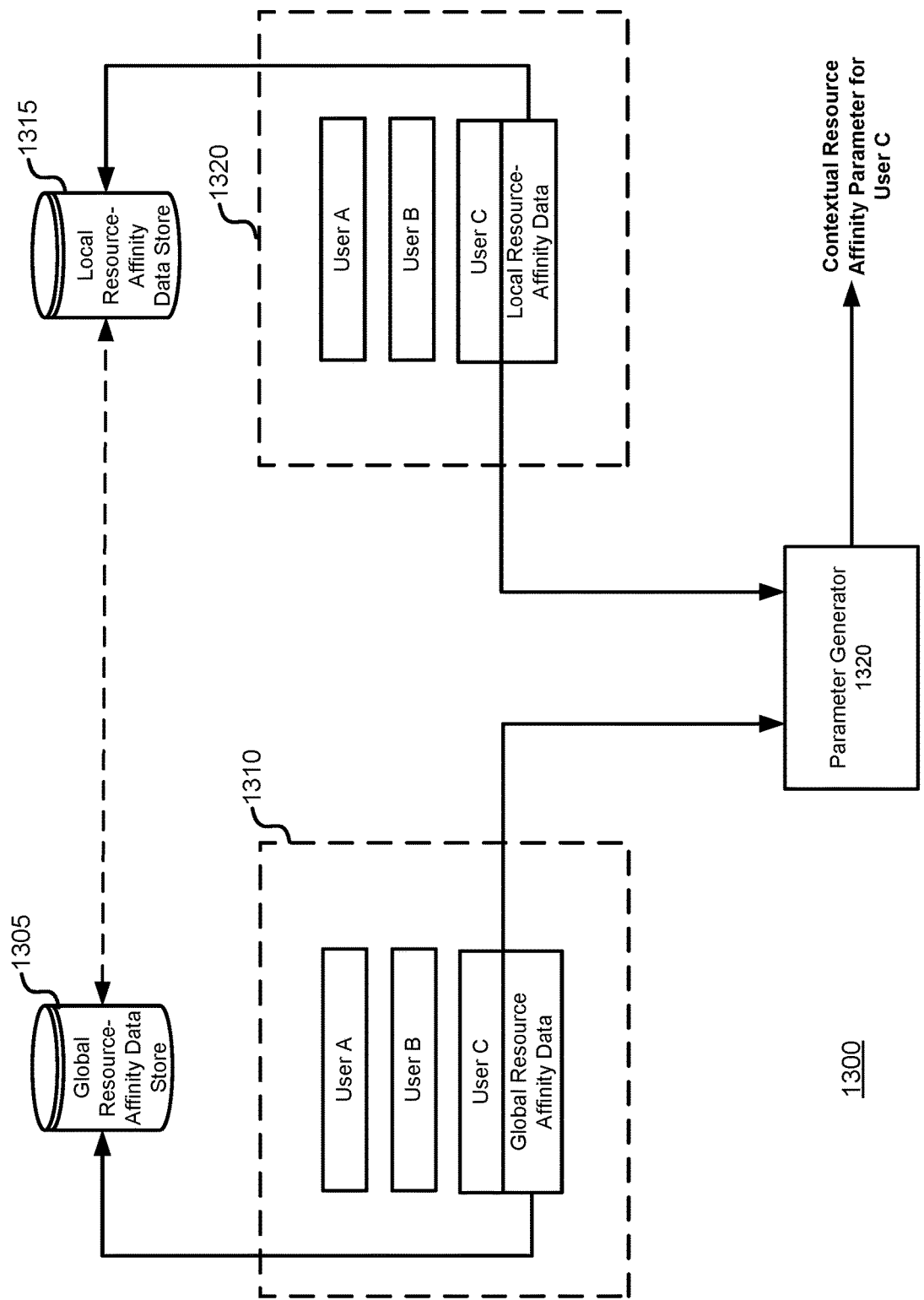
FIG. 13 is a block diagram illustrating a network environment for generating contextualized resource-affinity parameters using global and local resource-affinity parameters.

FIG. 13 is a block diagram illustrating network environment 1300 for generating contextualized resource-affinity parameters for users. Network environment 1300 can include global resource-affinity parameter data store 1305 and local resource-affinity parameter data store 1315. Global resource-affinity parameter data store 1305 can store data structure 1310, which includes the global resource-affinity parameters for one or more users (e.g., User A, User B, User C, and so on). Local resource-affinity parameter data store 1315 can store data structure 1320, which includes the local resource-affinity parameter for one or more users (e.g., User A, User B, User C, and so on). Each of the global resource-affinity parameters and local resource-affinity parameters can be generated by accessing and processing a plurality of data points, described herein. Further, in some examples, each of a global resource-affinity parameter and a local resource-affinity parameter may be generated for a particular user. In some examples, either a global or local resource-affinity parameter can be generated for a particular user.

Further, the global resource-affinity parameter data points and the local resource-affinity parameter data points can each be fed into a machine-learning model to generate a result that indicates a likelihood of the user accessing a resource (e.g., the likelihood being represented by the contextualized resource-affinity parameter). The engine 1320 can implement the machine-learning techniques to compute the contextual resource-affinity parameter for a user. For example, the combination of the global resource-affinity parameter and the local resource-affinity parameter may be implemented using one or more ensemble method learning algorithms. In some implementations, the algorithm used to calculate global resource-affinity parameters may be a classifier model (e.g., a support vector machine (SVM) model, kernel methods, etc.), however, the present disclosure is not limited thereto. In some implementations, the algorithm used to calculate local resource-affinity parameters may be a random forest model, however, the present disclosure is not limited thereto. The algorithms executed to calculate the global and local resource-affinity parameters may be the same or may be different from each other. In some implementations, the contextualized resource-affinity parameter may be a combination of the calculated global resource-affinity parameter and the calculated local resource-affinity parameter. Combining the global resource-affinity parameter and the calculated local resource-affinity parameter may include any combination technique, including averaging, summing, subtracting, multiplying, dividing, a weighted combination, or any complex combination technique.

While FIG. 13 illustrates that resource-affinity parameters for User A, User B, and User C are stored in each of data structures 1310 and 1320, it will be appreciated that any number of users can be represented in each of the data structures. For the purpose of illustration, User C is used to explain the global and local resource-affinity parameters.

As a non-limiting example, the global resource-affinity parameter can represent the likelihood that a user will ultimately access any resource generally. The global resource-affinity parameter is not specific to a particular resource, but rather the global resource-affinity parameter represents the general likelihood the user will access any resource. In some cases, the global resource-affinity parameter can represent the degree to which the user is predicted to be a bot. In some cases, the global resource-affinity parameter can represent the likelihood that a user will transfer an access right to another user.

Non-limiting examples of data points that are used to calculate the global resource-affinity parameter can include a distance between a detected user location and any resource-associated locations (e.g., spatial regions of a resource), previous access right assignment data (e.g., has the user transferred other access rights previously?), the number of access rights that were assigned to the user within a specified time period, frequency of being assigned to access rights that enable access to a resource during a time period, and being assigned to access rights that enable access to another resource during that same time period, has the user requested assignment of multiple sets of access rights in different transactions, third-party data sets, the local resource-affinity parameter of the user (e.g., the local resource-affinity parameter can be used as a data point for the global resource-affinity parameter, and vice versa), whether or not the user has requested assignment of an access right to a resource associated with a location that is different from the detected location of the user device (e.g., the location associated with the detected IP address), whether or not (and how many times) an access right requested by the user has been detected on a secondary load management system, how many times the user has ultimately accessed any resources using valid access rights, and other suitable data points. As described above, the global resource-affinity parameter indicates a likelihood of meeting an objective, however, the objective is not specific to a particular resource, but rather, indicates the likelihood of meeting an objective associated with resources generally.

Continuing with the non-limiting example above, the local resource-affinity parameter may be specific to an access right to a resource. For example, the local resource-affinity parameter can represent a likelihood that a user will ultimately access a particular resource during a time period when the resource is enabled to be accessible.

Non-limiting examples of data points that are used to calculate the local resource-affinity parameter can include any one or more of the data points used for the global resource-affinity parameter, and additionally or alternatively, affinity data from social media networks, historical data representing which web servers were previously accessed, the data provided by the user during an initialization process, device type used during the initialization process (e.g. to register the user), whether or not the user has previously accessed resources associated with a particular entity, whether or not the user has accessed the specific resource before, whether or not the user has previously transferred an access right to the particular resource to another user device, whether or not the user requested assignment of an access right to a resource associated with a location that is different from the detected user location (e.g., the location associated with the detected IP address), and other suitable data points. It will be appreciated that there may be overlap between the global resource-affinity parameter data points and the local resource-affinity parameter data points. As described above, the difference between the global resource-affinity parameter and the local resource-affinity parameter is that the global resource-affinity parameter represents a likelihood of the user meeting an objective associated with resources generally, whereas, the local resource-affinity parameter represents a likelihood of the user meeting an objective associated with a particular resource. It will be appreciated that the data points associated with global resource-affinity parameter may be inputted into the same machine-learning model or a different machine-learning model as the data points associated with the global resource-affinity parameter.

It will be appreciated that the global resource-affinity parameter and the local resource-affinity parameter can be any integer or non-integer between any range of values. Further, the range of values the global resource-affinity parameter may or may not be the same as the range of values for the local resource-affinity parameter. In some implementations, the range of values for each of the global resource-affinity parameter and the local resource-affinity parameter may any value between zero and one. In some implementations, the global and local resource-affinity parameters can be used to label users either positively or negatively. As a non-limiting example, when a user device completes the assignment process for an access right (e.g., the user requests that the access right be assigned to the user, and the access right is ultimately assigned to the user), and that user ultimately accesses the resource during the time period when the resource is accessible, the user can be labeled positively. In this example, a global resource-affinity parameter of 0.9 may be calculated for the user, which indicates a high likelihood of meeting an objective associated with resources generally. As another example, if the user device completed the assignment process, and the access right was detected at a secondary load management system, the user may be labeled negatively. In this example, a global resource-affinity parameter of 0.3 may be calculated for the user, which indicates a low likelihood of meeting an objective associated with resources generally.

Advantageously, if User C is requesting assignment for Resource A, but User C commonly transfers access rights to other user devices, the contextual resource-affinity parameter for User C in the context of Resource A may indicate that User C is likely to access Resource A during the time period when Resource A is accessible, whereas, the contextual resource-affinity parameter for User C in the context of Resource B may indicate that User C is not likely to access Resource B during the time period when Resource B is accessible.

Figure 14:
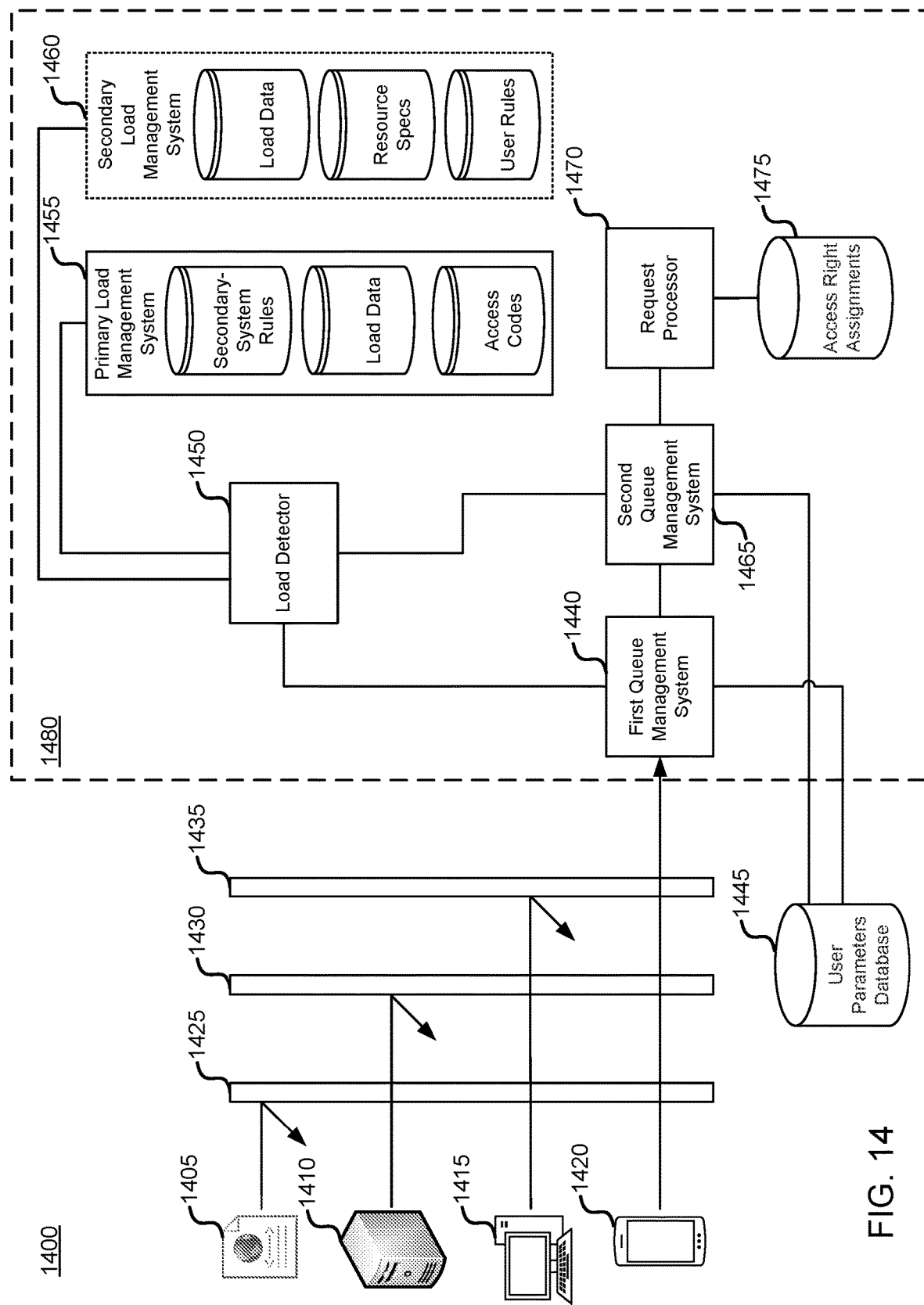
FIG. 14 is a block diagram illustrating a network environment for throttling access rights assignment workflows based on current system load.

FIG. 14 is a block diagram illustrating network environment 1400 for throttling access-right assignment workflows based on current system load(s). In some implementations, network environment 1400 may include bot 1405, server 1410, computer 1415, and mobile device 1420. Network environment 1400 may also include access management system 1480, which may be a system that manages the assignment of access rights to various users. For example, access management system 1480 can store unique identifiers that uniquely identify access rights. Access management system 1480 may also store (in association with each unique identifier) a user identifier associated with a user to which the access right(s) is assigned. Bot 1405 may include scripts that can be executed to autonomously perform one or more functions. Bot 1405 can use Application Programming Interfaces (APIs) to interact with systems. Server 1410 may include one or more servers configured to directly interact with access management system 1480 (e.g., using scripts). For example, server 1410 may automatically transmit a communication to access management system 1480 to query for access rights to a resource without a human user initiating the interaction. In some cases, server 1410 can execute bot 1405. Computer 1415 can be operated by a user to interact with access management system 1480 to request assignment to access rights to resources. Mobile device 1420 can also be operated by a user to interact with access management system 1480 to request assignment of access rights to resources.

Each of bot 1405, server 1410, computer 1415, and mobile device 1420 may individually transmit a communication (each at any time) to assignment management system 1480. For example, a communication from mobile device 1420 may correspond to a request to access a database storing a plurality of access rights to a resource. Detection layers 1425, 1430, and 1435 can detect and/or control unauthorized access to databases associated with access management system 1480. It will be appreciated that any number of detection layers may be implemented, and the various detection layers may be the same or different from each other. For example, detection layers 1425, 1430, and 1435 may each include a detection system or service that detects the presence of bots, hackers, specific systems (e.g., secondary management systems), or unauthorized user access using any number of detection techniques (e.g., IP blocking, client time limits, client request frequency limits, client request limits on access inventory, reverse TURING tests, speed or frequency of queries during a time period, API access behavior pattern evaluation, bot pattern evaluation of sensor data associated with the device transmitting the communication, and other suitable techniques), and then blocks the detected communications, systems, or users. As illustrated in FIG. 14, detection layers 1425, 1430, and 1435 detect that communications from bot 1405, server 1410, and computer 1415 are to be blocked because these communications were detected as originating by an unauthorized bot, server, or hacker, for example.

However, as illustrated in FIG. 14, the communication from mobile device 1420 may be communicated to access management system 1480 because the mobile device was not detected by detection layers 1425, 1430, and 1435, and thus, is likely to originate from an authorized human user. For example, the communication transmitted from mobile device 1420 may correspond to a request to access one or more databases that stores a plurality of access rights to resource(s). The user operating mobile device 1420 may be requesting access to the database of access rights in order to request that one or more of those access rights be assigned to mobile device 1420, which enables the user to gain access to the resource. Upon receiving the communication from mobile device 1420, access management system 1480 can process the communication using first queue management system 1440.

In some implementations, first queue management system 1440 may include one or more processors on which executable code (e.g., instructions) is stored, a queue, and/or a memory. For example, first queue management queue 1440 may execute a first workflow that enables mobile device 1420 to query one or more databases that store access rights to resources. The first workflow may include one or more steps, including but not limited to, prompting mobile device 1420 for login credentials, accessing user parameters database 1445 to evaluate one or more data points using a machine-learning model to generate a resource-affinity parameter, accessing load detector 1450 to determine a current load of communications received at primary load management system 1455 and/or secondary load management system 1460, and generating a first throttle factor to control the first workflow. Further, the secondary load management system 1460 may not generate the unique access codes, but rather, may provide a platform that enables users to reassign access rights to other users (e.g., the users who are reassigning the access rights may not ultimately access the access right during the time period when the access right is accessible, but instead, the user who receives the reassigned access right is the one who may ultimately access the resource during the time period). The current load may be based on a number of requests received at either or both of the primary load management system 1455 and the secondary load management system 1460. While the secondary load management system 1460 is illustrated in FIG. 14 as being within the access management system 1480, it will be appreciated that the secondary load management system 1460 may also be in a network that is outside or external to the access management system 1480. A current load may include a time or time period at or substantially near the time the communication is received. In some implementations, the first throttle factor generated by the first queue management system 1440 may be used to control the speed or frequency at which the steps of the first workflow are provided to mobile device 1420. For example, a first throttle factor may be a value, score, parameter, attribute, grade, or other suitable indicator that represents how fast or slow the steps are to be provided to mobile device 1420. As a non-limiting example, if the first throttle factor is generated between 0 and 1, such values approaching 0 represent steps of the first workflow being provided slower, whereas, values approaching 1 represent steps of the first workflow being provided faster (e.g., the scale of 0 to 1 being a scale of slow to fast). First queue management system 1440 may detect that the current load of requests received at primary load management system 1455 is low, and that the generated resource-affinity parameter (e.g., generated after inputting one or more data points into a supervised or semi-supervised machine-learning model) associated with the corresponding user identifier (e.g., of the user operating mobile device 1420) is associated with a resource-affinity parameter that indicates a likelihood that the user will ultimately transfer any assigned access rights (e.g., a low likelihood that the user will meet an objective of ultimately accessing the resource). In some implementations, first queue management system 1440 can generate the first throttle factor based on the current request load and the resource-affinity parameter. As a non-limiting example, the first throttle factor may be generated as a composite of the current request load and the resource-affinity parameter (e.g., an average of the two values, if the current request load and the resource-affinity parameter are represented as values). It will be appreciated that various algorithms can be used to generate the first throttle factor using the current request load and the resource-affinity parameter, such as weighted combinations, inverse relationships (e.g., when the current request load is low, the first throttle factor can indicate a quicker speed of providing the steps of the first workflow), dynamic algorithms that change based on contextual information, such as time of year, time until the resource becomes available for accessing, and other suitable algorithms.

Continuing with the non-limiting example above, if the current request load is low (as compared to a threshold, such as fewer than 50 requests an hour), then first queue management system 1440 can generate the first throttle factor to provide the steps of the first workflow quickly to mobile device 1420, even though the resource-affinity parameter indicates that the user associated with mobile device 1420 will not likely meet the objective of ultimately accessing the resource. In this non-limiting example, if the current request load is low, then the threshold of the resource-affinity parameter needed to control the speed of the steps of the first workflow relatively quickly is lower. This approach enables the access rights to be assigned during time periods of low request loads. However, as another non-limiting example, if the current request load is high (as compared to a threshold, such as more than 1000 requests an hour), then first queue management system 1440 can generate the first throttle factor to provide the steps of the first workflow to mobile device 1420 at a slow regular or irregular interval (or the mobile device 1420 can be blocked entirely from querying databases for access rights). In this non-limiting example, because the current request load is high, the threshold of the resource-affinity parameter needed to control the speed of the steps of the first workflow relatively quickly is higher. Accordingly, because the non-limiting example indicated that the resource-affinity parameter associated with mobile device 1420 indicates that the user operating mobile device 1420 will not likely ultimately access the resource, first queue management system 1440 provides the steps of the first workflow at a slow regular or irregular pace (or blocks the mobile device 1420 from querying the databases for assigning access rights).

It will be appreciated that first queue management system 1440 can generate an order parameter (e.g., a rank) for each user participating in the first workflow during a given time period (e.g., a time period prior to the resource being available for accessing with an access right), in addition to or in lieu of generating the first throttle factor. The order parameter can be used to position requests from user devices into a queue. In some implementations, at a particular time, some or all queue positions within the queue can be processed according to the order parameter. For example, processing a queue position in the queue can include performing a query of the database, such that constraints of the query are based on the constraints included in the request that was stored in that particular queue position being processed. For example, a constraint may include a number of access rights, a location of access rights, a type of access right, and so on. In some implementations, the order parameter that is generated may be calculated so as to position requests in favorable queue positions for requests associated with a resource-affinity parameter indicating a likelihood to meet an objective, and to position requests in less favorable queue positions for requests associated with a resource-affinity parameter indicating a likelihood of not meeting the objective.

Continuing with the non-limiting example above, in some implementations, when the communication has been processed by the first queue management system 1440, that means the first workflow has been completed. Completing the first indicates that mobile device 1420 has been authorized or otherwise enabled to query the databases that store the access rights. However, the first workflow enables users to query for access rights, however, the first workflow may not enable users to request that one or more access rights resulting from the query be assigned to the user. The second workflow controlled by second queue management system 1465 may provide the one or more steps involved in completing the assignment of access rights to users. In some implementations, the second workflow may include one or more steps that result in the assignment of access rights. These one or more steps may include, but are not limited to, presenting an interface on mobile device 1420 or causing an interface to be presented on mobile device 1420, receiving input from mobile device 1420 corresponding to the requisite information needed to complete the assignment process, receiving an instruction to complete the assignment of one or more access rights to the requesting user or the requesting user's profile, and other suitable steps.

Second queue management system 1465 may generate a second throttle factor, which can determine a speed or frequency (regular or irregular) at which the one or more steps of the second workflow are provided to or presented on mobile device 1420. In some implementations, the resource-affinity parameter (e.g., the likelihood that the user will meet an objective) and the current system load may be combined to generate the second throttle factor. It will be appreciated that various algorithms can be used to generate the second throttle factor using the current request load and the resource-affinity parameter, such as weighted combinations, inverse relationships (e.g., when the current request load is low, the first throttle factor can indicate a quicker speed of providing the steps of the first workflow), dynamic algorithms that change based on contextual information, such as time of year, time until the resource becomes available for accessing, and other suitable algorithms. In some implementations, request processor 1470 can complete the process of assigning an access right to mobile device 1420. Completing the process of assigning an access right may include storing a user identifier associated with mobile device 1420 in association with the unique identifier representing the assigned access right. Request processor 1470 may include one or more processors on which executable code is stored, which, when executed, causes the user identifier to be stored in association with the access right in access right assignments database 1475. Access right assignments database 1475 may include one or more databases, which store some or all of the unique identifiers of the access rights, additional information associated with the access rights, such as time and location of the resource, and the assignment information, such as the users to which an access right is assigned. It will be appreciated that access management system 1480 may be implemented with first queue management system 1440 only, second queue management system 1465 only, or any other number of queue management systems in addition to or in lieu of first queue management system 1440 and second queue management system 1465. It will be appreciated that the resource-affinity parameter may refer to the contextualized resource-affinity parameter. It will be appreciated that the resource-affinity parameter may refer to one of the global or local resource-affinity parameter.

Figure 15:
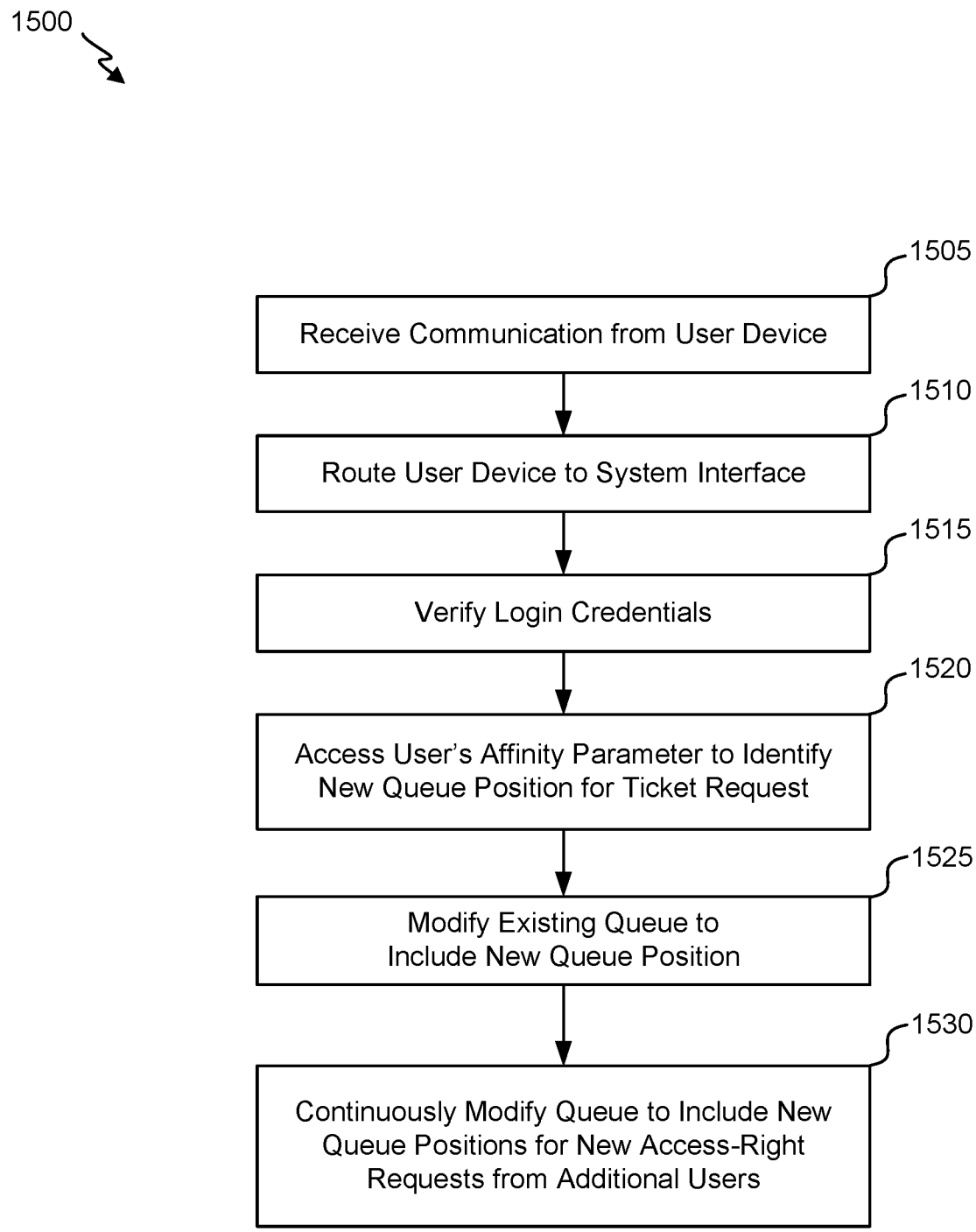
FIG. 15 is a flow diagram illustrating an embodiment of a process for continuously modifying queues during the different time periods.

FIG. 15 is a flow diagram illustrating an embodiment of process 1500 for continuously modifying queues in advance of access rights being available for querying. Process 1500 can be performed, at least in part, by the primary load management system. Further, instead of requesting users to provide login credentials to the access management system at the end of the assignment process, the login prompt is moved earlier in the assignment process. Process 1500 begins at block 1505 where a user operates a computing device to transmit a signal representing a request for access rights for a particular resource (e.g., using an interface that enables querying of databases of access rights managed by the primary load management system).

At block 1510, the primary load management system may receive the signal representing the user's request for access rights to a request. In response, the primary load management system may route the user to an interface associated with the primary load management system. For example, the primary load management system may transmit interface data of the interface to the computing device operated by the user. The interface may be accessed using a browser (e.g., a mobile web browser) or by a native application running on a mobile device. At block 1515, the primary load management system can be configured to receive the login credential inputted by the user and verify whether the login credentials are stored in internal security databases. If the user's login credentials are verified, the primary load management system can access the user's resource-affinity parameter at block 1520. In some implementations, the user's resource-affinity parameter can be used to determine whether or not to initiate an additional process flow associated with the resource. The primary load management system can identify a queue position to be assigned to the user's request, such that the queue position is a position in an existing queue that is determined based on the accessed resource-affinity parameter. The existing queue may include a plurality of queue positions. Each queue position can correspond to a particular user's access right request. Users with resource-affinity parameters that indicate a higher likelihood of meeting an objective may be placed in favorable queue positions in the existing queue. For example, a favorable queue position may be a position in the queue that will be processed earlier than others. The user's resource-affinity parameter may determine which queue position to place the user's request for access rights.

At block 1525, the primary load management system may modify the existing queue to include the queue position that corresponds to the user (identified at block 1520). At block 1530, the primary load management system may continuously modify the existing queue as new users access the primary load management system and request access rights to the resource. Each resource may be associated with one or more queues. Each queue may store one or more queue positions. Each queue position may store a user request for assignment of one or more access rights to that resource. For example, new queue positions can be inserted into the queue and the placement of the new queue positions in the queue is determined based on the user's resource-affinity parameter. It will be appreciated that the user's resource-affinity parameter can be accessed for queuing purposes in other situations, as well. However, the location of the placement in the queue can be modified depending on the user's resource-affinity parameter. For example, if the user has a resource-affinity parameter that indicates a high likelihood of meeting an objective, the user may be placed at the beginning of the queue. It will also be appreciated that the queue placement can be based on factors other than, or in addition to, the resource-affinity parameter. Non-limiting examples of other factors include the value associated with the access rights or the number of access rights requested for assignment, the likelihood that the user will meet an objective associated with the specific resource, and other suitable factors.

Figure 16:
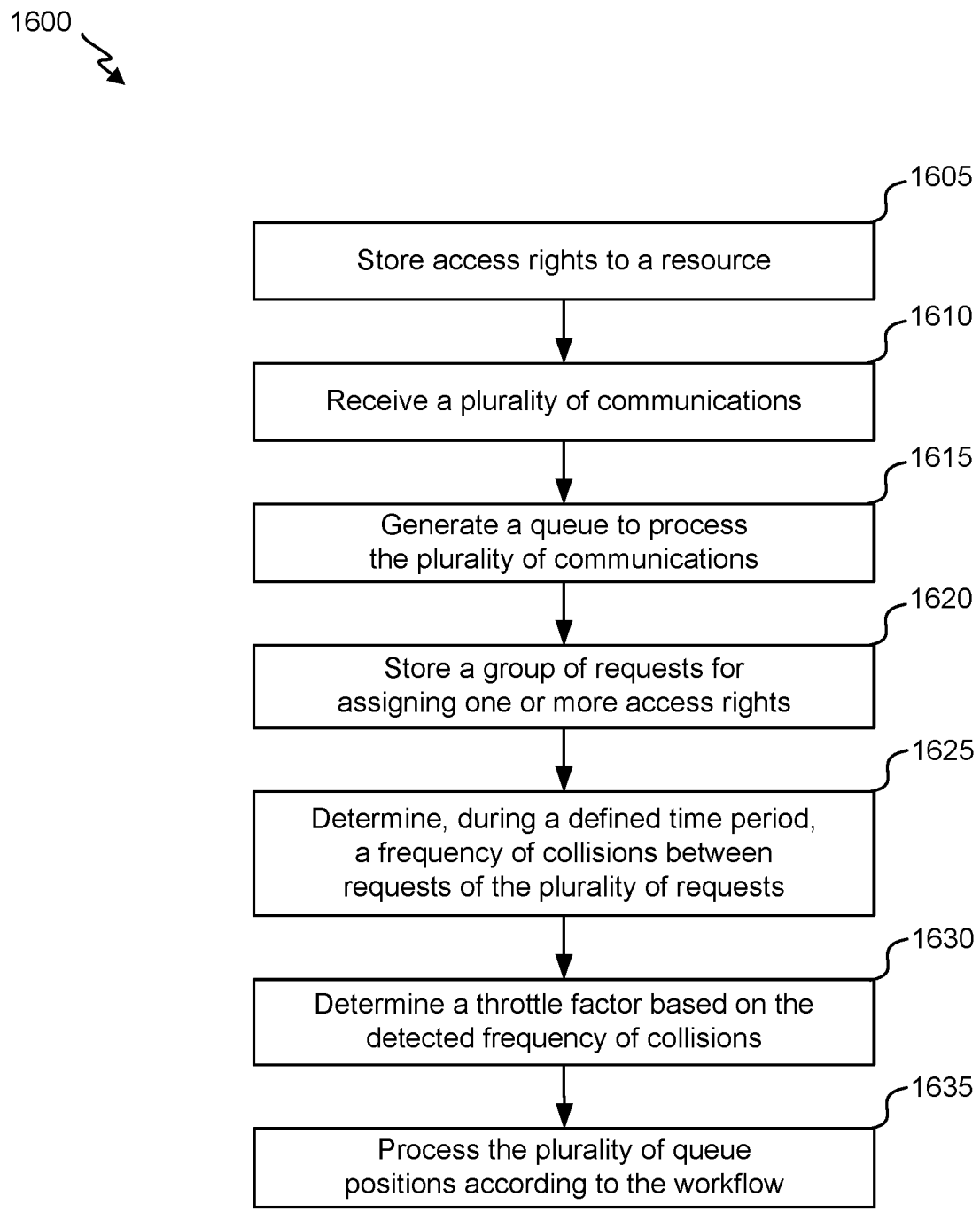
FIG. 16 is a flow diagram illustrating an embodiment of a process for throttling up or down a number of queue positions processed during a time period based at least in part on a detected collision rate.

FIG. 16 is a flow diagram illustrating process 1600 for throttling up or down a number of queue positions processed during a time period based at least in part on a detected collision rate. Process 1600 can be performed, at least in part, by the primary load management system described herein. In some implementations, instead of requesting users to provide login credentials to the access management system at the end of the assignment process, the login prompt is moved earlier in the assignment process so as to collect user data before assigning a queue position to the user's request for access rights. Process 1600 begins at block 1605 where a plurality of access rights to resources are stored at one or more databases associated with the primary load management system. Each access right of the plurality of access rights may enable access to a particular resource. Further, each access right of the plurality of access rights may be unique from other access rights of the plurality of access rights. For example, each access right may be for a different location within a spatial location (e.g., different seat in a venue).

At block 1610, the primary load management system may receive a plurality of communications from user devices. Each communication of the plurality of communications may be a signal that includes data representing a request for assignment of one or more access rights of the plurality of access rights. In some implementations, each communication of the plurality of communications being transmitted by a user device accessing an interface operated by or associated with the primary load management system. The interface may, for example, be a login page or homepage that enables a user to initiate the process of accessing the interface for querying access rights. As a non-limiting example, a user may operate a computing device (e.g., user device) to access a homepage or login page associated with the primary load management system. From the homepage or login page, for example, the user device may cause a signal to be transmitted to the primary load management system. The signal may represent a request to access an interface that will enable the user to query for one or more access rights of the plurality of access rights stored at the one or more databases. In response to receiving the signal, the primary load management system may store the request at a queue position of a digital queue.

At block 1615, the primary load management system may generate a queue to process the plurality of communications received from user devices. In some implementations, the queue may include a plurality of queue positions. Each queue position of the plurality of queue positions may be configured to store a request that corresponds to a communication (of the plurality of communications) received from a user device. The queue may be a digital queue (e.g., a data structure) that stores (in queue positions of the queue) requests from users in an order that is based on any number of factors, including, for example, first in time, a resource-affinity parameter (described in greater detail above), or any other ordering process. At block 1620, a group of requests for assigning one or more access rights may be stored at the primary load management system. Each request of the group of requests may be stored in a queue position of the queue. The group of requests may include at least a portion of requests that correspond to the plurality of communications. In some implementations, one or more queue positions may be processed by identifying a queue position (e.g., by an identifier), retrieving any data associated with the queue position (e.g., retrieve a user profile of the user associated with the request for the particular queue position), and processing that retrieved data, for example, by enabling the user device to access the interface that provides querying capability of the plurality of access rights. The rate or processing queue positions may be determined by the number of queue positions that are provided access to the interface for querying access rights over a defined time period, such as a minute (e.g., 100 queue positions may be processed a minute).

At block 1625, the primary load management system may determine a frequency or rate of collisions between requests of the plurality of requests. In some implementations, a collision being determined upon at least two requests requesting a same access right of the plurality of access rights within the defined time period. For example, a collision may be detected upon determining (by the primary load management system) that two or more different users accessed the interface for querying access rights, and requested the same access right within a defined time period.

The time period may be defined in any manner (e.g., user defined or automatically defined, and may be a relatively short time period, such as one minute, two minutes, 5 minutes, 10 minutes, and so on).

At block 1630, the primary load management system may determine a throttle factor based on the detected frequency or rate of collisions. The throttle factor may be a value that represents a degree to which the primary load management system controls a workflow associated with processing one or more queue positions of the plurality of queue positions. For example, the workflow may cause a modifiable rate of queue positions to be processed. In some implementations, the modifiable rate may be determined based at least in part on the throttle factor. As a non-limiting example, at a given time, the primary load management system may detect 100 collisions a minute. Soon thereafter, the primary load management system may detect 200 collisions a minute, and automatically, the primary load management system may reduce (e.g., throttle lower) the number of users that are provided access to the interface. Throttling lower the number of users that are provided access to the interface allows the heavily-loaded interface to naturally reduce its processing load when users leave the interface (by completing an assignment process or by navigating to another interface page), while at the same time, slowing down the number of users who can access the interface. Advantageously, throttling the number of users who can access the interface efficiently processes the queue positions of the queue.

At block 1635, the primary load management system may process the plurality of queue positions according to the workflow. For example, the workflow may be a process for assigning one or more access rights to a user (e.g., an assignment process). The processing may include identifying one or more queue positions of the plurality of queue positions at the modifiable rate and enabling the user device associated with each queue position of the one or more queue positions to complete an assignment process for assigning one or more access rights to the user device. The modifiable rate may be the rate at which users (or queue positions are processed) are provided access to the interface (e.g., an event data page (EDP)). The rate is modifiable because during times of high collision rates, the rate can be modified to be lower (e.g., slowing down the number of users who have access to the interface per minute). Conversely, during times of low collision rates, the rate can be modified to be higher (e.g., increasing the number of users who have access to the interface per minute). Ultimately, using this rate-modification technique, the collision rate can be kept at a substantially similar or substantially constant rate.

It will be appreciated that the modifiable rate of processing queue positions may be automatically modified so as to maintain a substantially constant frequency of collisions. Further, modifying the modifiable rate may include increasing or decreasing a number of queue positions processed (e.g., increasing or decreasing the number of users who are enabled to access the interface for querying and requesting assignment of access rights) during an additional time period. It will also be appreciated that the modifiable rate of processing queue positions may be initially determined based on a total number of access rights of the plurality of access rights that have not been assigned to at least one user device upon enabling the plurality of access rights to be assigned to user devices.

It will also be appreciated that wherein the operation of identifying the one or more queue positions of the plurality of queue positions at the modifiable rate may include generating a resource-affinity parameter (as described in greater detail herein above) for each user device associated with a queue position of the identified one or more queue positions. Further, the generation of the resource-affinity parameter may be based on a machine-learning-based ranking technique using one or more previous patterns of behavior associated with an identifier of the user device. The primary load management system may select one or more user devices for which the generated resource-affinity parameter is equal to or exceeds a threshold. The selected one or more user devices may correspond to the identified one or more queue positions and be enabled to complete the assignment process. The machine-learning-based technique may include, for example, one or more machine-learning algorithms or techniques, such as an ensemble of multi-label classifiers (e.g., supervised learning), artificial neural networks (including backpropagation, Boltzmann machines, etc.), bayesian statistics (e.g., bayesian networks or knowledge bases), logistical model trees, support vector machines, information fuzzy networks, Hidden Markov models, hierarchical clustering (unsupervised), self-organizing maps, clustering techniques, and other suitable machine-learning techniques (supervised or unsupervised). The primary load management system may execute the one or more machine-learning algorithms on data from a user profile, for example, which may include a history of previously-assignment access rights associated with the user. Further, for example, the primary load management system may generate a score a result of processing the user profile data using the one or more machine-learning algorithms. In some implementations, the score may be configured to represent the authenticity of the user as being human, and not being a bot user (e.g., a bot script configured to mimick a human user).

It will be appreciated the plurality of communications may be stored in the plurality of queue positions on a first-in-time basis. For example, the first-in-time basis may cause a first communication received at a first time (e.g., 8:00 AM on a particular day) to be stored at a first queue position and a second communication received at a second time (e.g., 8:02 AM on the particular day) to be stored at a second queue position. When the first time is before the second time, the first communication stored at the first queue position is processed before the second communication stored at the second queue position. In some implementations, the plurality of communications are stored in the plurality of queue positions on a pseudo-random basis. In some implementations, requests for access rights are stored in the queue not based on a first-in-time basis, but on the pseudo-random or fully random basis, using one or more randomization techniques. It will be appreciated that the interface may be displayed on a user device, and the interface may enable a user to query the plurality of access rights associated with the resource for at least one access right that satisfies a constraint (e.g., a location, a date, etc.).

It will be appreciated that the throttling techniques may no longer be useful, and thus may be stopped, when all of the access rights to a resource have been assigned to users. At this time, no more collisions would be detected because access rights have already been assigned to users. It will also be appreciated that the present disclosure is not limited to throttling based on a rate of collisions detected. Rather, in some implementations, the throttling of queue processing may be based at least in part on workflow completions detected (e.g., cart conversions).

It will be appreciated that a collision may be detected in the aggregate (all collisions detected through the interface) or on a per session basis (this particular user who is logged in to the primary load management system has caused 15 collisions). It will be appreciated that users who have logged into the primary load management system may be limited in how many queries the user can execute (e.g., a maximum of 4 queries). In some implementations, the users are limited in terms of how much time they have been accessing the interface. Once the limit has been reached, the user's access to the interface is revoked, and the user can no longer query for access rights for a defined time period. It will also be appreciated that the throttling techniques described above and herein may be initialized using a value representing a number of access rights to a resource that are available for assignment to users. As a non-limiting example, the initial throttle value (e.g., the initial number of queue positions that are processed within a time period) may be determined based on the number of access rights to a resource that are available for assignment (e.g., a number of queue positions that equal to roughly 30% of the all available access rights to a resource can be initially processed per minute). Other parameters that may be determined based on the number of available access rights (e.g., available upon the access rights being made available to the public) may include minimum throttle, throttle increment, starting throttle, collision set point (e.g., the collision rate that is a target for maintaining), and other suitable parameters. In some implementations, the particular values of the parameters described above, such as the starting throttle, may be calculated using the Fibonacci series, however, the present disclosure is not limited thereto.

It will also be appreciated that the specific queue positions that are processed at a given time may be selected based on various factors, including, but not limited to, the next queue position based on a time of the corresponding request was received, the resource-affinity parameter associated with the user who transmitted the request, or by random selection techniques.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system, comprising:
one or more processors; and
a non-transitory computer-readable storage medium containing instructions which, when executed on the one or more processors, cause the one or more processors to perform operations including:
displaying a first interface on a plurality of user devices, the first interface being associated with a resource;
receiving, at the first interface, first input from each of the plurality of user devices, the first input corresponding to a request for access to a second interface, the second interface being configured to enable a user to request assignment of an access right granting access to the resource;

determining, during a defined time period, a frequency of collisions between requests of the plurality of requests, a collision being determined upon at least two requests requesting a same access right within the defined time period;

determining a throttle factor based on the detected frequency of collisions, the throttle factor being a modifiable rate of user devices being provided access to the second interface, wherein the throttle factor is used to control a workflow associated with processing one or more requests of the plurality of requests, and the workflow causing the modifiable rate of user devices to be processed during a processing time period;

selecting one or more user devices from the plurality of user devices, wherein a number of the one or more user devices is selected from the plurality of user devices based on the throttle factor;

processing the one or more requests of the plurality of requests by providing the selected one or more user devices with access to the second interface;

receiving, at the second interface, second input from each of the selected one or more user devices, the second input requesting assignment of one or more access rights to the resource; and completing a transaction for one or more second inputs received at the second interface.

2. The system of claim 1, wherein the operations further comprise:

storing a plurality of access rights to the resource, each access right of the plurality of access rights being associated with a digital ticket that enables access to the resource, wherein the resource is associated with an event, and each access right of the plurality of access rights being unique from other access rights of the plurality of access rights.

3. The system of claim 1, wherein the operations further comprise:

determining an additional throttle factor based on one or more characteristics of a user device or of the first input transmitted by the user device, wherein the additional throttle factor controls an aspect of interacting with the second interface.

4. The system of claim 3, wherein the aspect of interacting with the second interface is a speed of loading the second interface.

5. The system of claim 1, wherein the operations further comprise:

generating a queue to process the first input from each of the plurality of user devices, the queue including a plurality of queue positions, each queue position of the plurality of queue positions being configured to store the first input corresponding to a user device of the plurality of user devices; and storing a group of requests for assigning one or more access rights, each request of the group of requests being stored in a queue position of the queue, and the group of requests including at least a portion of requests received from the plurality of user devices.

6. The system of claim 5, wherein the operations further comprise:

processing the plurality of queue positions according to a workflow, the processing including identifying one or more queue positions of the plurality of queue positions at the modifiable rate and enabling the user device associated with each queue position of the one or more queue positions to complete an assignment process for assigning one or more access rights to the user device.

7. The system of claim 5, wherein the modifiable rate indicates a modifiable number of queue positions of the plurality of queue positions that are processed together during the processing time period, and the modifiable rate being determined based at least in part on the throttle factor.

8. A computer-implemented method, comprising:

displaying a first interface on a plurality of user devices, the first interface being associated with a resource;

receiving, at the first interface, first input from each of the plurality of user devices, the first input corresponding to a request for access to a second interface, the second interface being configured to enable a user to request assignment of an access right granting access to the resource;

determining, during a defined time period, a frequency of collisions between requests of the plurality of requests, a collision being determined upon at least two requests requesting a same access right within the defined time period;

determining a throttle factor based on the detected frequency of collisions, the throttle factor being a modifiable rate of user devices being provided access to the second interface, wherein the throttle factor is used to control a workflow associated with processing one or more requests of the plurality of requests, and the workflow causing the modifiable rate of user devices to be processed during a processing time period;

selecting one or more user devices from the plurality of user devices, wherein a number of the one or more user devices is selected from the plurality of user devices based on the throttle factor;

processing the one or more requests of the plurality of requests by providing the selected one or more user devices with access to the second interface;

receiving, at the second interface, second input from each of the selected one or more user devices, the second input requesting assignment of one or more access rights to the resource; and completing a transaction for one or more second inputs received at the second interface.

9. The computer-implemented method of claim 8, further comprising:

storing a plurality of access rights to the resource, each access right of the plurality of access rights being associated with a digital ticket that enables access to the resource, wherein the resource is associated with an event, and each access right of the plurality of access rights being unique from other access rights of the plurality of access rights.

10. The computer-implemented method of claim 8, further comprising:

determining an additional throttle factor based on one or more characteristics of a user device or of the first input transmitted by the user device, wherein the additional throttle factor controls an aspect of interacting with the second interface.

11. The computer-implemented method of claim 10, wherein the aspect of interacting with the second interface is a speed of loading the second interface.

12. The computer-implemented method of claim 8, further comprising:

generating a queue to process the first input from each of the plurality of user devices, the queue including a plurality of queue positions, each queue position of the plurality of queue positions being configured to store the first input corresponding to a user device of the plurality of user devices; and storing a group of requests for assigning one or more access rights, each request of the group of requests being stored in a queue position of the queue, and the group of requests including at least a portion of requests received from the plurality of user devices.

13. The computer-implemented method of claim 12, further comprising:

processing the plurality of queue positions according to a workflow, the processing including identifying one or more queue positions of the plurality of queue positions at the modifiable rate and enabling the user device associated with each queue position of the one or more queue positions to complete an assignment process for assigning one or more access rights to the user device.

14. The computer-implemented method of claim 12, wherein the modifiable rate indicates a modifiable number of queue positions of the plurality of queue positions that are processed together during the processing time period, and the modifiable rate being determined based at least in part on the throttle factor.

15. A computer-program product tangibly embodied in a non-transitory machine-readable storage medium, including instructions configured to cause a processing apparatus to perform operations including:

displaying a first interface on a plurality of user devices, the first interface being associated with a resource;

receiving, at the first interface, first input from each of the plurality of user devices, the first input corresponding to a request for access to a second interface, the second interface being configured to enable a user to request assignment of an access right granting access to the resource;

determining, during a defined time period, a frequency of collisions between requests of the plurality of requests, a collision being determined upon at least two requests requesting a same access right within the defined time period;

determining a throttle factor based on the detected frequency of collisions, the throttle factor being a modifiable rate of user devices being provided access to the second interface, wherein the throttle factor is used to control a workflow associated with processing one or more requests of the plurality of requests, and the workflow causing the modifiable rate of user devices to be processed during a processing time period;

selecting one or more user devices from the plurality of user devices, wherein a number of the one or more user devices is selected from the plurality of user devices based on the throttle factor;

processing the one or more requests of the plurality of requests by providing the selected one or more user devices with access to the second interface;

receiving, at the second interface, second input from each of the selected one or more user devices, the second input requesting assignment of one or more access rights to the resource; and completing a transaction for one or more second inputs received at the second interface.

16. The non-transitory machine-readable storage medium of claim 15, wherein the operations further comprise:

storing a plurality of access rights to the resource, each access right of the plurality of access rights being associated with a digital ticket that enables access to the resource, wherein the resource is associated with an event, and each access right of the plurality of access rights being unique from other access rights of the plurality of access rights.

17. The non-transitory machine-readable storage medium of claim 15, wherein the operations further comprise:

determining an additional throttle factor based on one or more characteristics of a user device or of the first input transmitted by the user device, wherein the additional throttle factor controls an aspect of interacting with the second interface.

18. The non-transitory machine-readable storage medium of claim 17, wherein the aspect of interacting with the second interface is a speed of loading the second interface.

19. The non-transitory machine-readable storage medium of claim 15, wherein the operations further comprise:

generating a queue to process the first input from each of the plurality of user devices, the queue including a plurality of queue positions, each queue position of the plurality of queue positions being configured to store the first input corresponding to a user device of the plurality of user devices; and storing a group of requests for assigning one or more access rights, each request of the group of requests being stored in a queue position of the queue, and the group of requests including at least a portion of requests received from the plurality of user devices.

20. The non-transitory machine-readable storage medium of claim 19, wherein the operations further comprise:

processing the plurality of queue positions according to a workflow, the processing including identifying one or more queue positions of the plurality of queue positions at the modifiable rate and enabling the user device associated with each queue position of the one or more queue positions to complete an assignment process for assigning one or more access rights to the user device.

* * * * *